(12) United States Patent
Matzke et al.

(10) Patent No.: US 9,568,952 B2
(45) Date of Patent: Feb. 14, 2017

(54) DISPLAY DEVICE APPARATUS

(71) Applicant: Portal Dual Inc., Pittsburgh, PA (US)

(72) Inventors: Ben Matzke, Pittsburgh, PA (US);
Nicholas Greco, Pittsburgh, PA (US)

(73) Assignee: Portal Dual Inc., Pittsburgh, PA (US)

( * ) Notice: Subject to any disclaimer, the term of this patent is extended or adjusted under 35 U.S.C. 154(b) by 0 days.

(21) Appl. No.: 14/847,355

(22) Filed: Sep. 8, 2015

(65) Prior Publication Data
US 2016/0070302 A1 Mar. 10, 2016

Related U.S. Application Data

(60) Provisional application No. 62/047,939, filed on Sep. 9, 2014.

(51) Int. Cl.
*G06F 1/16* (2006.01)
*G06F 3/14* (2006.01)
*G06F 3/147* (2006.01)

(52) U.S. Cl.
CPC ........... *G06F 1/1649* (2013.01); *G06F 1/1675* (2013.01); *G06F 1/1681* (2013.01); *G06F 3/147* (2013.01); *G06F 3/1423* (2013.01)

(58) Field of Classification Search
CPC .... G06F 1/1649; G06F 1/1632; G06F 1/1675; G06F 1/1681; G06F 3/1423; G06F 3/147
USPC ........................................ 361/679.04–679.07
See application file for complete search history.

(56) References Cited

U.S. PATENT DOCUMENTS

| | | | | |
|---|---|---|---|---|
| 6,302,612 B1* | 10/2001 | Fowler | ................... | F16C 11/06 16/224 |
| 6,532,146 B1* | 3/2003 | Duquette | .............. | G06F 1/1607 361/679.04 |
| 6,700,773 B1* | 3/2004 | Adriaansen | .......... | G06F 1/1618 345/156 |
| 6,778,383 B2* | 8/2004 | Ho | ........................ | G06F 1/1607 248/917 |
| 9,411,371 B1* | 8/2016 | Goren | ................... | G06F 1/1632 |
| 2004/0042163 A1* | 3/2004 | Tutikawa | .............. | G06F 1/1616 361/679.04 |
| 2004/0196209 A1* | 10/2004 | Chen | ..................... | G06F 1/1601 345/1.1 |
| 2005/0253775 A1* | 11/2005 | Stewart | ................. | G06F 1/1616 345/1.1 |
| 2007/0247792 A1* | 10/2007 | Yang | .................... | G06F 1/1616 361/679.27 |
| 2007/0247798 A1* | 10/2007 | Scott, II | ................ | G06F 1/1616 361/679.04 |
| 2008/0198096 A1* | 8/2008 | Jung | ..................... | G06F 1/1616 345/1.3 |
| 2010/0124006 A1* | 5/2010 | Chang | .................. | G06F 1/1616 361/679.04 |

(Continued)

*Primary Examiner* — Nidhi Thaker
(74) *Attorney, Agent, or Firm* — Buchanan Ingersoll & Rooney PC

(57) ABSTRACT

A display device apparatus includes a housing that is sized and configured to attach to a computer device. The housing can include a cavity for releaseably retaining a second display device that is connectable to the computer device. The second display device is moveable out of the housing via a slot defined in the housing so that the second display device is moveable from a first position within the housing to a second position that is external to the housing.

13 Claims, 20 Drawing Sheets

(56) References Cited

U.S. PATENT DOCUMENTS

2010/0246119 A1* 9/2010 Collopy ............... G06F 1/1616  
    361/679.55  
2011/0298690 A1* 12/2011 Reilly .................. G06F 1/1601  
    345/1.1

* cited by examiner

DISPLAY DEVICE APPARATUS

CROSS-REFERENCE TO RELATED APPLICATION

The present application claims priority to U.S. Provisional Patent Application No. 62/047,939, which was filed on Sep. 9, 2014. The entirety of U.S. Provisional Patent Application No. 62/047,939 is incorporated by reference herein.

FIELD OF THE DISCLOSURE

The present disclosure is directed to a device that is configured for attachment to a computer device for providing a second display device to supplement a display device of that computer device.

BACKGROUND

Some types of computers can be electronically connected to multiple displays. For instance, a second display can be connected to a desktop computer or laptop computer that can extend the available monitor space for the user of that computer. A connector provides a wired connection between the second display to the computer to associate the secondary screen with the primary computer. This connector as well as the secondary display are removed when not in use and stored separately from the primary computing device.

SUMMARY

Embodiments of the invention can solve limited screen real estate problems by allowing users to conveniently attach and hide a second external screen adjacent to the bottom of their laptop, netbook, tablet, internet appliance, or other type of mobile computer device. When a user is in need of a second screen they can press a button or otherwise actuate a mechanism that is configured to allow an at least partially hidden screen to move from adjacent the bottom of the computer device and be moved into a position for use of the second screen such that at least two different screens are able to display data from the computer device so that a user is able to work on the computer device while utilizing the multiple screens. When the user is done with the additional second screen, the additional second screen can be repositioned underneath the user's computer device.

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of the display device apparatus, and methods of making the same are shown in the accompanying drawings. It should be understood that like reference numbers used in the drawings may identify like components.

DETAILED DESCRIPTION

Figure 1:
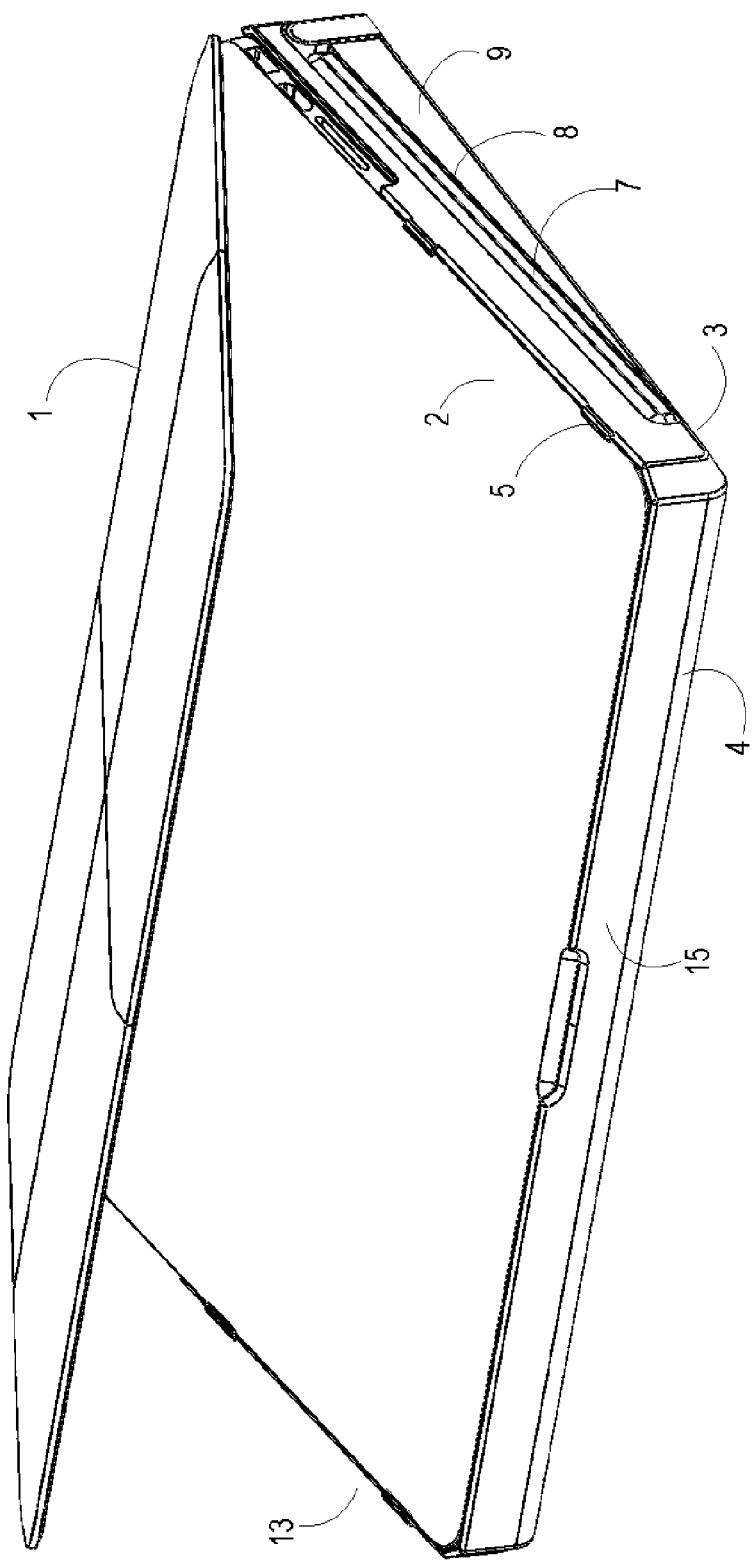
FIG. 1 illustrates a perspective view of a computer device attached to a first exemplary embodiment of the display device apparatus with a display device of the computer device in a first position and the display device of the display device apparatus in a first position.

Referring to FIGS. 1-11, a computer device 1 such as a laptop computer, notebook computer, desktop computer, electronic tablet computer device, a mobile computer device, a smart phone, an internet appliance, or other type of computer device can be connected to a display device apparatus 3. The computer device 1 can include a first display device 2 such as a liquid crystal display or monitor that is integral to the housing of the device or is otherwise connected to the computer device 1. For tablet or smartphone embodiments, the computer device may include a liquid crystal display or other screen that is integral to a housing of the device. For laptop computer embodiments of the computer device, the first display device 2 of that computer device may be hingedly connected to a housing of the computer device. For desktop computer devices, the first display device of the computer device 1 may be connected to a desktop housing of the computer device.

The display device apparatus 3 can include a housing having an inner cavity defined therein that is sized and configured to receive and retain at least one second display device 7 within the housing. The second display device 7 can be a liquid crystal display, monitor, or other type of display device that provides at least one screen on which information can be output to a user of the computer device when the second display device 7 is connected to the computer device.

The housing 4 of the display device apparatus 3 can include a plurality of fingers 5 that are configured to clip onto a bottom portion of the computer device 1 for connecting to the bottom portion of the computer device 1. The bottom portion of the computer device 1 may be the portion that is opposite the side of the computer device having a display and/or having a hinged connection to the display. The fingers 5 may project from an upper portion of the housing of the display device apparatus 3 for resiliently engaging the bottom of a computer device that is opposite a top side of the computer device to which a display device is attached. An upper portion of the housing may be shaped and configured to facilitate receiving a bottom portion of the computer device 1 for seating the computer device 1 onto the housing of the display device apparatus 3 and to help facilitate engagement with the fingers 5. For instance, a top portion of the housing can be sized and configured to define a recess shaped to receive a bottom portion of the computer device for seating that portion of the computer device on the top portion of the housing while the fingers may project onto sides adjacent the bottom of the computer device to engage with those sides of the lower portion of the computer device that is above the bottom of the computer device.

In some embodiments, the fingers 5 may project upwardly from first and second sides 9, 13 of the housing that are positioned on opposite sides of a front side 15 of the housing and a rear side 16 of the housing. In other embodiments, the fingers 5 may project from the front and rear sides 15, 16 as well. In yet other embodiments, fingers 5 may only project from the front and rear sides 15, 16 instead of the first and second sides 9, 13.

It is contemplated that the housing could be sized and configured differently for attachment to different types of computer devices. For instance, alternative embodiments can be configured for attachment to a desktop personal computer device. In some embodiments, it is contemplated that the fingers 5 of the housing of the display device apparatus could be configured for attachment to a top portion of the computer device instead of a bottom of the computer device 1. For instance, for electronic tablet embodiments of the computer device, the fingers may be configured to engage with a top side or upper portions of sidewalls extending between the top and bottom of the tablet.

The fingers 5 can be configured to permit a releasable attachment of the housing of the display device apparatus 3 to the computer device 1. For instance, the fingers can be configured to retain the computer device 1 in attachment to the housing 4 until a force that is over a pre-selected force is exerted upwardly on the computer device away from the housing 4 to remove the computer device 1 from the housing 4. Such a force could be a force of 10-500 Newtons or at least 50 Newtons in force for some embodiments. Upon such an upward force being exerted on the computer device 1, the fingers may resiliently move away from the computer device 1 to permit the computer device 1 to be separated from the housing 4.

The fingers 5 may have any of a number of different shapes or sizes. For instance, fingers 5 can extend as linear or curved projections from a side of a housing to which the fingers project. In other embodiments, each of the fingers 5 may be oblong, oval, elliptical, polygonal, or tapered and extend from the side of housing to which it is attached to a distal end at which the finger is narrower than the portion of the finger that is located at or adjacent the side of the housing to which that finger is attached. In some embodiments, a central portion of the finger may have a central opening or a plurality of apertures to help define a rigidity of the finger and/or other property of the finger.

The fingers could also, or alternatively, be beveled such that a laptop or other computer device can be positioned vertically downward onto the housing such that the fingers will resilient move to receive the laptop and subsequently return to a position near their original position to grasp and hold the laptop or other computer device. The fingers 5 can be configured to not release the computer device after receiving that device unless a user causes the fingers to bend away from the computer device the fingers have received and engaged. For instance, the fingers can be structured (e.g. beveling, angling, curvature of the fingers, etc.) so that an upward motion of the computer device does not result in the fingers 5 from moving away from the computer device. A user may cause the fingers to move away from the computer device to release the computer device. For instance, a user may use a mechanical tool or the user's hands to bend the fingers out of engagement with one side of the computer device and subsequently angle the computer device to move away from the fingers still engaging the computer device.

The fingers 5 can also be moveable away from a computer device engaged by the fingers to release the engaged computer device. For instance, fingers on a side of the housing can be attached to a slider mechanism or other mechanism that may be actuated to move those fingers our of engagement with the computer device to release that computer device and permit the computer device to be removed from the housing 4 of the apparatus 3. The fingers 5 extending from the first side 9 or the second side 13 can be attached to a moveable portion of that side, for example. A user may actuate movement of that side so that the side moves away from the computer device and permits the computer device to be released. For instance, fingers 5 attached to the first or second side 9 or 13 can be attached to swivelable or slideable side that can be slid, pivoted, or otherwise moved to adjust the position of the fingers 5 extending from that side away from the computer device to release engagement with the computer device. For instance, the first or second side 9 or 13 can be hingedly or pivotally connected to the front side 15 or rear side 16 such that a user can actuate a motion of the first or second side 9 or 13 so that the fingers move away from the computer device to release the computer device. As another example, the first or second side can be extendably and retractably connected to the front and rear sides 15, 16 so that a horizontal position of the fingers can be adjusted from a locked position in which the fingers 5 are in contact with and in engagement with a computer device to a release position in which the fingers are horizontally positioned spaced apart from the computer device and out of engagement with the computer device.

The first side 9 of the housing can also have a slot 8 or other type of aperture that is in communication with the cavity in which the second display device 7 is positionable. The slot 8 can be sized to permit the display device 7 to be moved out of the cavity within the housing. The second display device 7 can be moveably connected to the housing 4 of the display device apparatus 3 such that the second display device 7 is moveable from a first position within the cavity of the housing 4 to a second position that is exterior to the housing 4. The second display device 7 can be slid or otherwise moved out of the slot 8 to be extended out of the cavity within the housing so that the second display device 7 is moved from the first position to the second position. After being moved out of the housing, a hinge assembly 11 can be configured to permit the second display device 7 to be rotated about at least one vertical axis and at least one horizontal axis so that the second display device 7 is moveable after it is positioned out of the cavity and is external to the housing 4.

For instance, the hinge assembly 11 can include one or more substantially horizontal axles 11a to which the display device is attachable as well as at least one substantially vertical axle 11b to which the display device is connectable such that the display device 7 is vertically titlable about the substantially horizontal axle 11a and is also horizontally pivotable external to the housing about the substantially vertical axle 11b. The hinge assembly 11 can be configured so that the display device 7 is flippable out of the housing and into one or more different positions in which a user may desire to position the display device 7.

In some embodiments, the substantially horizontal axle 11a can be configured to be perfectly horizontal or can extend linearly along an angle of declination or inclination of 0°-5° and the substantially vertical axle 11b can be configured to be perfectly vertical or can extend linearly such that the axle is within 5° of being perfectly vertical.

The hinge assembly 11 can be moveably attached to the housing 4 such that the hinge assembly 11 is moveable from a position within the housing to a position external to the housing. For example, the hinge assembly 11 can be connected to a moveable body 25 that is attached to a rail 21 or other member positioned within the housing 4. A wheeled carriage 23 that includes one or more wheels can be positioned between the rail 21 and the moveable body 25 to moveably connect the moveable body 25 to the rail 21 so that the moveable body is slideable along a path defined by the rail 21. The rail 21 may be an integral wall, projection, protuberance, or sidewall that is defined in the body of the housing or may be a separate member that is fastened or otherwise attached to the housing 7 to define the path of movement for the moveable body 25. The rail 21 can define a path of movement for the moveable body from a first position that is adjacent to the second side 13 of the housing to a first position that is adjacent to the first side 9 of the housing. In some embodiments, the path defined by the rail may be linear. In other embodiments, the path defined by the rail may be curved or include one or more curved segments.

The substantially vertical axle 11b can be attached to the moveable body 25 and the substantially horizontal axle 11a can also be attached to the moveable body 25 such that the second display device 7 is moveable when the moveable body 25 is moved along the path defined by the rail 21. When the moveable body is in its second position, the second display device 7 may be positioned entirely outside of the housing 4 via the hinge assembly 11. When the moveable body 25 is in its first position adjacent the second side 13 of the housing, the second display device may be entirely within the housing by being positioned entirely within the cavity of the housing. A portion of the second display device 7 may be visible through the slot 8 of the housing that is defined in the first side 9 of the housing when the moveable body is in its first position and the second display device is entirely within the cavity of the housing 4. In other embodiments, it is contemplated that a portion of the second display device 7 may slightly extend out of the slot 8 or be flush with the first side of the housing 4 when the moveable body 25 is in its first position and the second display device is within the cavity of the housing 4.

The housing 4 may also have a plurality of rollers 28, such as pulleys or other types of rollers attached to the housing 4 and positioned within the cavity of the housing 4. The rollers 28 may be attached to the housing 4 via vertically extending axles so that each of the rollers 28 rotate about a vertical axis. The rollers can be positioned to contact with or otherwise engage a side of the second display device and rotate to help assist movement of the second display device 7 when the moveable body 25 is moved along the path defined by the rail 21.

When the second display device 7 is positioned external to the housing 4 (e.g. in a second position), a detent mechanism 30 can be provided to help keep the second display device 7 positioned external to the housing. The detent mechanism 30 can be configured to help bias the moveable body 25 in its second position adjacent the first side 9 of the housing 4 and the slot 8 to help prevent the moveable body 25 from being accidentally moved away from the first side 9 of the housing and/or the slot 8 when a user desires to keep the display device 9 external to the housing 4. Such a feature can also help reduce the chances of a part becoming damaged while the second display device 7 is positioned external to the housing 4.

The detent mechanism 30 can include a rotatable detent member 31 that is moveable horizontally about a substantially vertical axle. A coil spring 31c or other biasing member can be positioned adjacent to or in engagement with a top of the detent member 31 to bias detent member 31 downwardly into engagement with the housing. A torsion spring 31d can be attached to the axle of the detent mechanism about which the detent member rotates and can be positioned near a bottom of the detent member so that the torsion spring 31d is configured to engage at least a middle portion 31b of the detent member 31b to bias the middle portion 31b of the detent member to move about the vertical axis to towards a second position in which a distal end 31a of the detent member is away from a rear side 16 of the housing and adjacent the rail 21 and in contact with an end of the moveable body 25 that is opposite the end of the moveable body 25 to which the hinge assembly 11 is attached.

The detent mechanism 30 can be configured so that when the moveable body 25 is in its first position adjacent the second side 13 of the housing, the detent member is in a first position such that its distal end 31*a* is near the rear side 16 of the housing. A portion of the hinge assembly 11 or a portion of the moveable body may be in contact with or engagement with the detent member 31 to prevent the detent member from moving out of its first position. When the moveable body 25 is moved to its second position near the first side 9 of the housing, the moveable body 25 and/or hinge assembly 11 may be out of engagement with the distal member such that the detent member 31 is moved via the biasing force of the torsion spring 31*d* so that the distal member rotates about the vertical axis so that the distal end 31*a* moves away from the rear side 16 of the housing and to a position in which the distal end 31*a* engages with an end of the moveable body 25. The detent member 31 can then exert a force via the torsion spring 31*d* and the detent member 31 on the moveable body 25 to help bias the moveable body to its second position. A user may need to exert a force on the second display device 7 and/or moveable body 25 that overcomes this biasing force to actuate motion of the second display device 7 back within the housing 4 and motion of the moveable body 25 back towards the second side 13 of the housing 4.

In addition to the torsion spring 31*d*, one or more portions of the housing 4 may be contoured or otherwise shaped to help bias the detent member 31 to stay in its extended second position. For example, a first portion 37 of the housing adjacent the vertical rotational axis of the detent member 31 can be ramped to engage the detent member 31 so that friction is induced when the detent member 31 is moved from its second extended position to its retracted position in which the distal end 31*a* is near the rear side 16 of the housing 4. As another example, a floor portion 39 of the housing can be shaped to also help induce friction when the detent member 31 is moved away from its extended, second position.

An actuation mechanism can be attached to the housing 4 that is configured to actuate motion of the moveable body 25, hinge assembly 11, and second display device 7 when the display device is within the cavity of the housing. In some embodiments, the actuation mechanism can include a cut out or other aperture 33 that may be defined near the slot 8 so that a user can place one or more fingers through the aperture 33 and into the housing to contact the hinge assembly 11 to provide a force to actuate a sliding motion of the moveable body 25 along the path defined by the rail 21.

In other embodiments, the actuation mechanism 40 may include a button 41 that is slideable within a groove 43 defined on the external rear side 16 of the housing. A user may slide the button 41 from a first position to a second position within the groove. The slider button 41 can be attached to the moveable body 25 and/or hinge assembly 11 such that motion of the button 41 causes the moveable body 25 to begin to move out of its first position near the second side 13 of the housing and towards the first side of the housing such that a portion of the hinge assembly 11 and/or a portion of the second display device 7 is moved out of the housing 4 and so that a user may hold or grab that element and pull the rest of the second display device 7 out of the housing 4 via the slot 8. In yet other embodiments, it is contemplated that the actuation mechanism can include a depressible button that can be depressed to actuate an initial movement of the moveable body.

Figure 14:
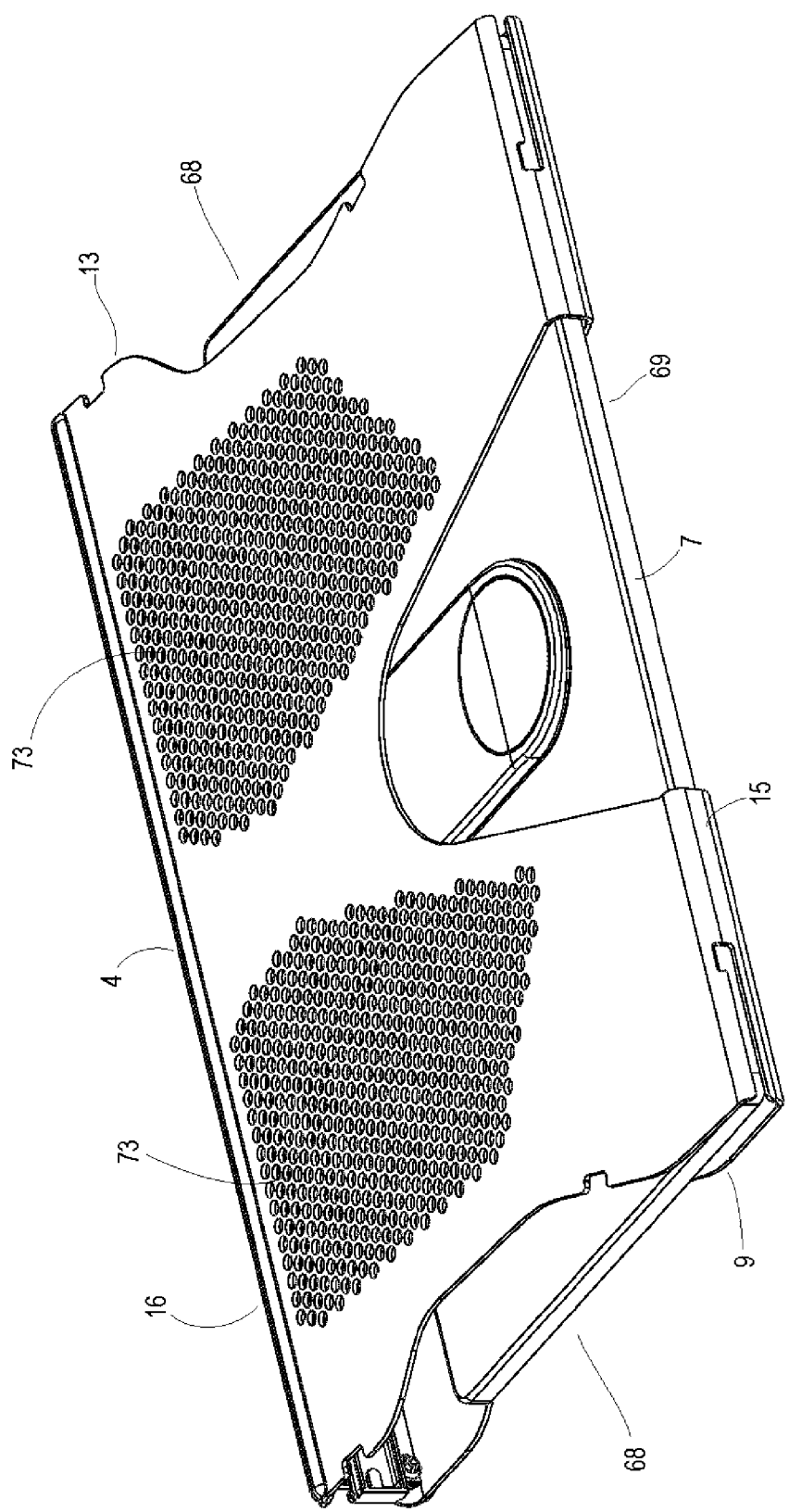
FIG. 14 is a perspective view of the second exemplary embodiment of the display device apparatus with the display device of the display device apparatus in a third position in which the display device is positioned within the housing.
Figure 15:
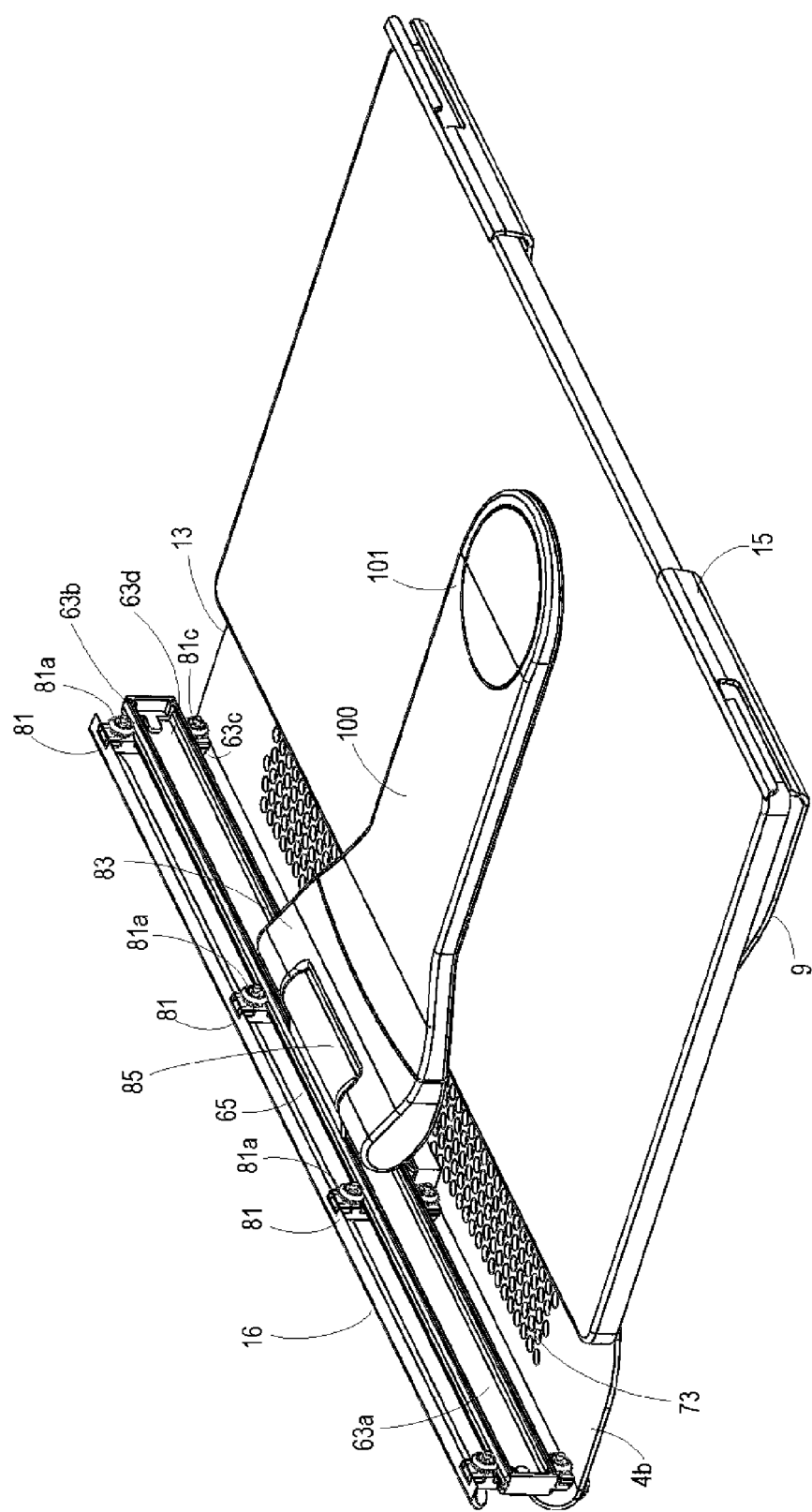
FIG. 15 is a perspective view of the second exemplary embodiment of the display device apparatus as shown in FIG. 14 with the upper wall of the housing removed to illustrate the display device and display device movement mechanism positioned within the housing.
Figure 16:
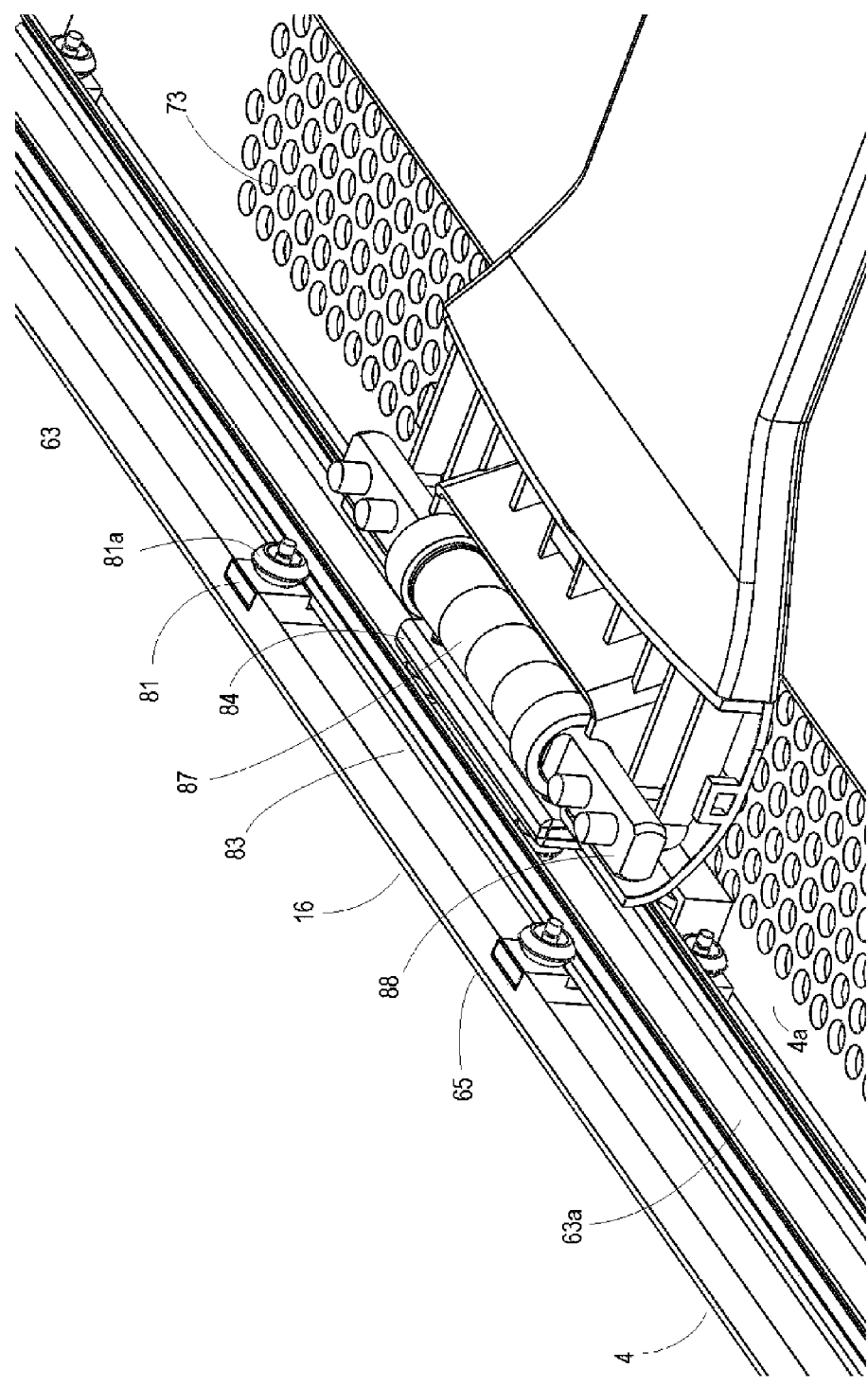
FIG. 16 is a fragmentary view of the second exemplary embodiment of the display device apparatus with a portion of the display device movement mechanism cut away to illustrate portions of this mechanism.
Figure 17:
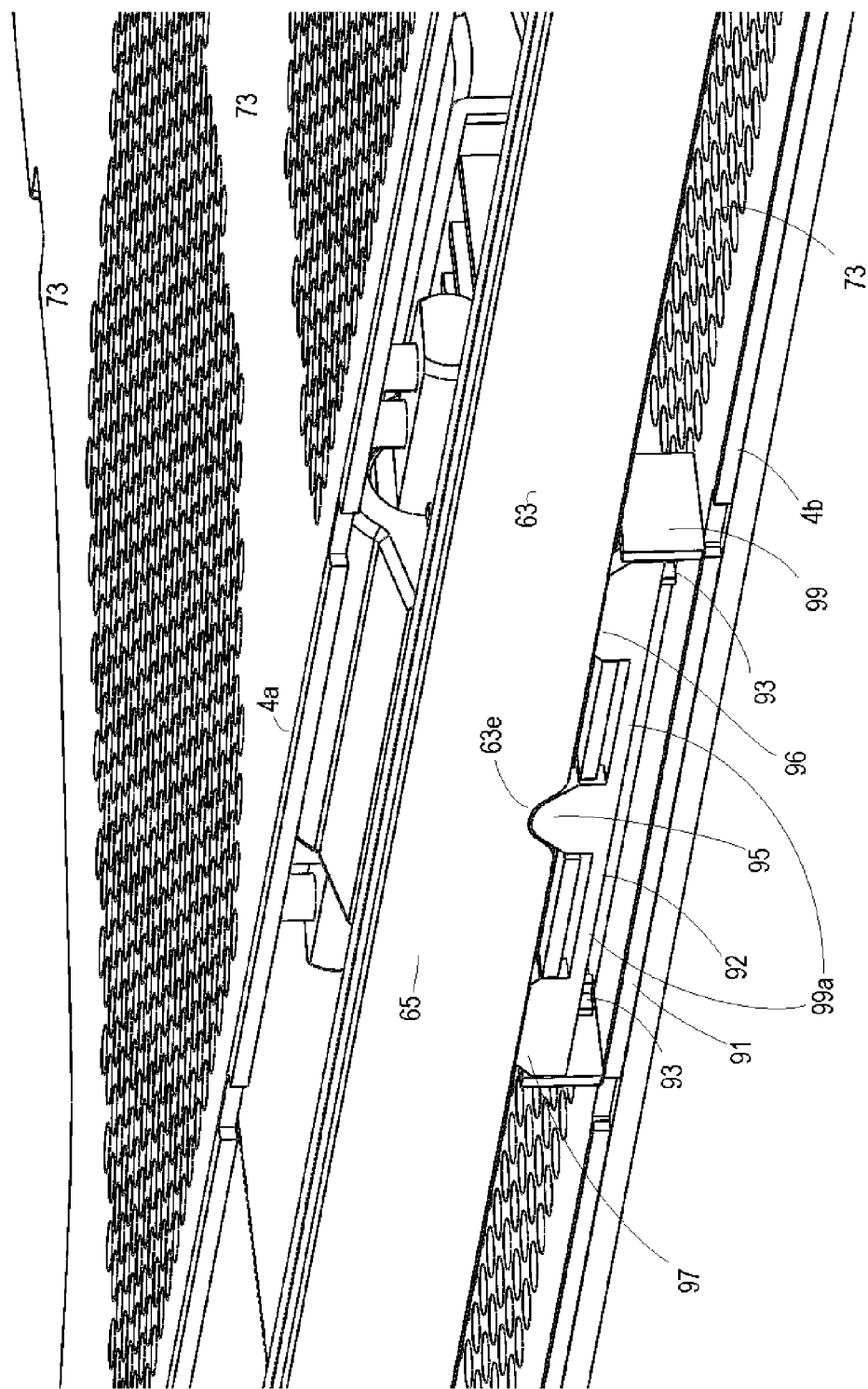
FIG. 17 is a rear perspective view of the second exemplary embodiment of the display device apparatus with the display device in its third position. An optional third wall of the housing positionable at the rear of the housing is removed in the view of FIG. 17.
Figure 18:
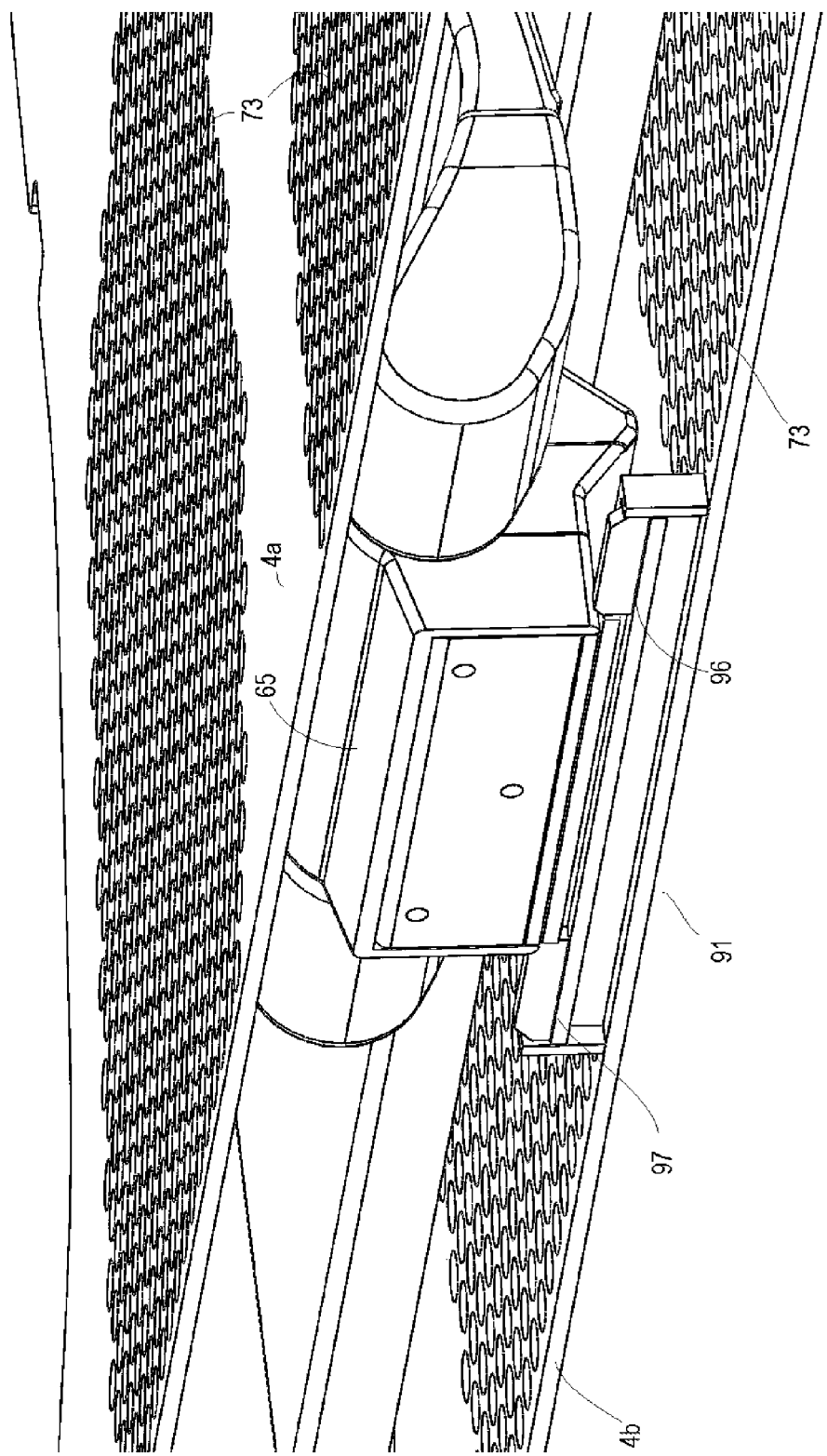
FIG. 18 is a view similar to FIG. 17 with the moveable bar element of the display device movement mechanism cut away to illustrate other portions of the display device movement mechanism.
Figure 19:
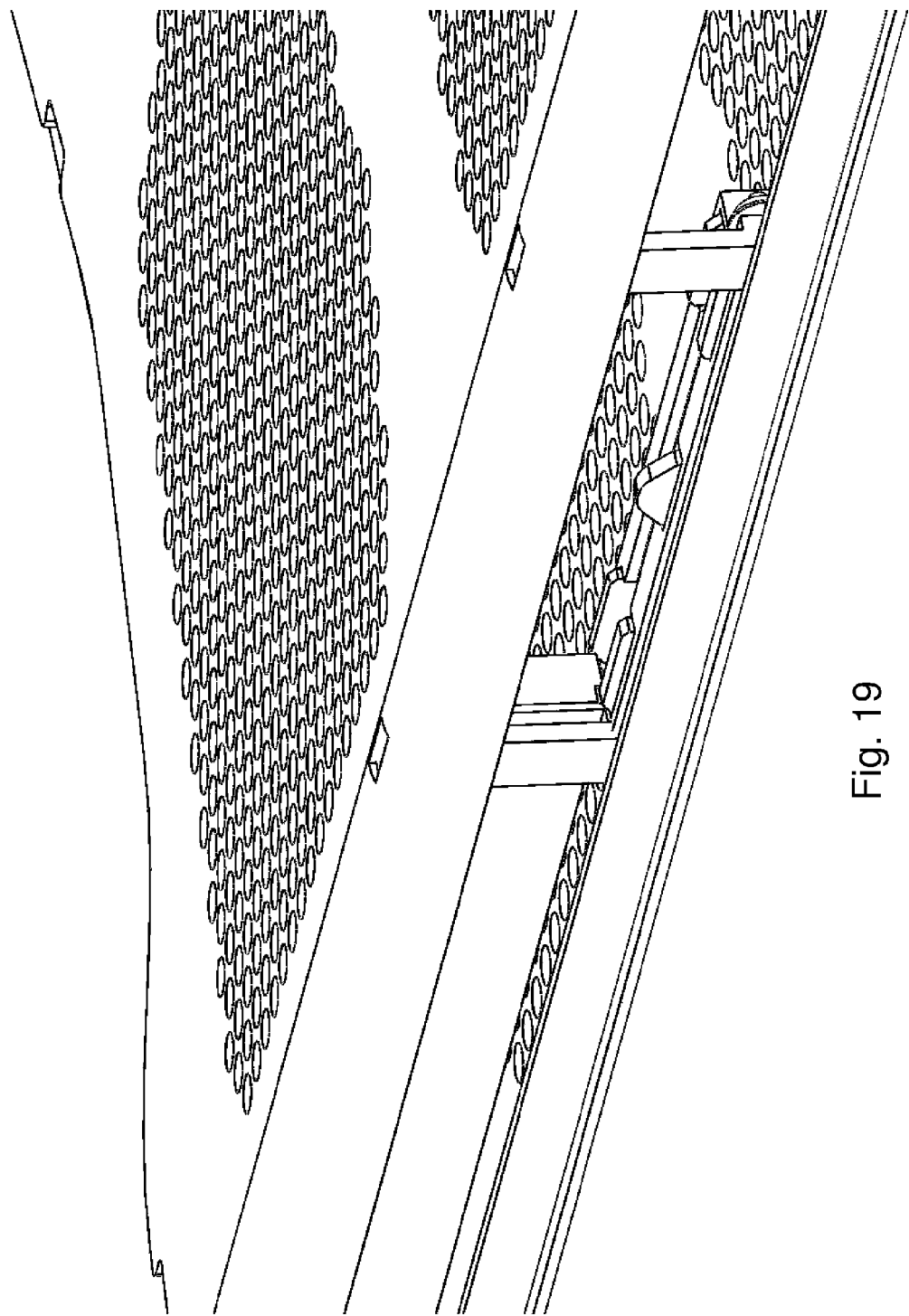
FIG. 19 is a view similar to the view of FIG. 17 of the second exemplary embodiment of the display device apparatus with the bar element of the display device movement mechanism in another position corresponding to a location of the display device as it is moved from the third position to its first position.

Referring to FIGS. 12-20, a second exemplary embodiment of the display device apparatus 3 can include a housing 4 having a top 4*a*, bottom 4*b*, front side 15, rear side 16, a first side 9 extending between the front and rear sides 15, 16 and second side 13 extending between the front 15 and rear sides 15, 16 that is opposite the first side 9. The housing 4 can define an inner cavity 69 that is sized to retain a display device 7. The first side 9 and second side 13 can each define a slot 68 or other opening in communication with the cavity 69 that is sized and configured such that at least one display device 7 is passable out of the cavity 69 and out of the slots 68 from a retained position to deployed positions, such as the deployed first and second positions shown in FIGS. 12 and 13. For instance, the display device 7 may be moveable from a retained third position in which the display device is within the housing 4 as shown in FIG. 14 to first and/or second deployed positioned external to the housing 4 adjacent to the first and second sides 9, 13 of the housing 4. The display device 7 can be a liquid crystal display, monitor, or other type of display device that provides at least one screen on which information can be output to a user of the computer device when the second display device 7 is connected to the computer device.

The top and bottom 4*a*, 4*b* of the housing 4 can have a plurality of venting apertures 73, such as holes, bores, or other types of openings that are configured to permit air to pass through. The venting apertures can be configured to help air flow pass along the housing to help keep a mobile computer connected to the housing from overheating. The housing can also have connection apertures 5*a* formed in the top 4*a* of the housing 4 on the first and second sides of the housing. The connection apertures 5*a* can be configured to mate with a connection mechanism for releaseably connecting a mobile computer device to the top 4*a* of the housing 4. For instance, finger mechanism can be connected to the top 4*a* of the housing 4 at each of the connection apertures. In some embodiments, the connection mechanism may mateably connect at the connection apertures 5*a* to connect to the top 4*a* of the housing 4 for releaseably connecting a mobile computer device to the housing 4 such that the base of the mobile computer device can contact the top 4*a* of the housing 4 and be supported by the housing 4 when positioned on a desk, table, a user's legs, or other work surface.

A display device movement mechanism 65 moveably connects the display device 7 to the housing 4 such that the display device 7 is moveable from a stowed third position to the deployed first or second positions. The display device movement mechanism 65 can include a moveable elongated member 63 that includes a central channel 63*a* defined in one side of the elongated member 63. The elongated member may be a rigid rail in some embodiments, such as a rail formed of a rigid polymeric material or a metal. The central channel 63 can be defined between upper and lower walls 63*b*, 63*c* of the elongated member and a side 63*d* of the elongated member that extends from the upper wall to the lower wall of the elongated member 63. The upper and lower walls 63*b* and 63*c* can extend horizontally along the elongated member and be contoured to mate with wheels 81*a* that are rotatable to guide motion of the elongated member 63 as the elongated member 63 is slid out of the housing 4 so that an end of the elongated member is external to the housing 4. The wheels 81*a* can be positioned to guide motion of the elongated member 63 by rollably engaging the top and bottom walls 63*b*, 63*c* of the elongated member 63.

In other embodiments, these carriages 81 may have nonrolling upper features or a non-rolling upper structural profile that is configured to mate with, contact or otherwise engage with the upper wall 63b and lower features or a non-rolling lower structural profile that is configured to which mate with, contact or otherwise engage with the lower wall 63c that are configured to guide the elongated member 63 similarly to the wheels 81a.

The wheels 81a may be wheels 81a that are attached to roller carriages 81 connected to the rear 16 side of the housing 4. The carriages 81 can be attached to the housing 4 to position the wheels 81a such that each carriage 81 has an upper wheel that rollably engages the upper wall 63b and a lower wheel that rollably engages the lower wall 63c. There may be a plurality of spaced apart carriages 81 attached to the housing 4. For instance, there may be carriages positioned adjacent to the first and second sides 9 and 13 of the housing along or adjacent to the rear of the housing 4. There may also be other carriages positioned near the middle of the rear side of the housing 4.

The display device movement mechanism 65 can also include a hinge assembly 66 for connecting the display device 7 to the elongated member 63. The hinge assembly 66 can connect the display device 7 such that the display device 7 is rotatable about at least one vertical axis via a first rotatable connection mechanism 67 that permits the display device to be rotated horizontally about a vertical axis. The horizontally rotated position of the display device via the vertical axis may be maintained via a spring mechanism or spring-like friction element that is configured to maintain the position of the display device at a user selected location until a force is exerted that is greater than the friction or force induced by this element.

The hinge assembly 66 can also include a second rotatable connection mechanism 83 that connects the display device 7 to the elongated member 63 such that the display device 7 is rotatable about a horizontal axis 85 that extends along a portion of the length of the elongated member 63. The second rotatable connection mechanism 83 can permit the display device to be moved vertically about the horizontal axis 85.

The second rotatable connection mechanism 83 can include a spring 87 that is configured to engage an axle 88 to provide a force for maintaining a position of the display device 7 to a user selected position so that after a user exerts a force on the display device to pivot the display device to a particular position, the vertical positioning of the display device is maintained via the spring 87.

The display device movement mechanism 65 also includes a rear body 84 that is attached to the hinge assembly and is positionable within the central channel 63a of the elongated member 63 and/or is moveable along the central channel 63a such that the rear body is slideable along the length of the elongated member 63 to provide adjustable positioning of the hinge assembly along the length of the elongated member 63. The slideable motion may be facilitated via slideable members, wheels, or other elements that can be attached to the rear body 84 and positioned within the central channel 63a for a moveable connection to the elongated member 63 within the central channel 63a.

The display device 7 can be connected to the first and second rotatable connection mechanisms 67, 83 via a connector 100 that includes a rotatable connector 101 that permits the display device 101 to be rotated from a landscape layout to a portrait layout via rotation of the display device 7 about a disc or other round or circular member of the rotatable connector 101. The axis of rotation of the display device for this rotatable connector 101 can be perpendicular to the screen face of the display device. In some embodiments, the rotation may be about a polygonal shaft or other rotatable element instead of a rounded element. The rotatable element may be a component of the connector 100 that connects the display device 7 to at least one of the rotatable connection mechanisms of the hinge assembly 66.

The ends of the elongated member 63 may define end walls of the central channel 63a that can prevent the rear slideable body 84 from becoming slid out of the channel 63a. Alternatively, the rear body can include a user actuatable slider stop mechanism that can be actuated from a first position to a second position (and vice versa) for unlocking and locking slideable motion of the rear body 84.

The elongated member 63 can also be configured to define a home position for stowing of the display device 7, such as the third position of the display device shown in FIG. 14. For example, the elongated member may have an aperture 63e defined in its lower portion that is sized and configured to contact with an interlock with a projection 95 that extends from a detent mechanism 91. The projection 95 can be shaped to extend from a body 92 of the detent mechanism to mate with the aperture 63e to contact with or otherwise engage the elongated member 63 within that aperture 63e to help prevent the elongated member from sliding relating to the housing to a deployed position on accident (e.g. helps retain the display device in the third position until a user provides a force that is sufficient to indicate that the user actually intends to actually slide the elongated member to deploy the display device 7 from the third position into the first position or the second position).

The detent mechanism 91 can also include a plurality of spring members 93 that can be positioned adjacent to the bottom 4b of the housing to contact or otherwise engage the moveable body 92 to bias the moveable body to a first position in which the projection 95 is within the aperture 63e and engages the elongated member 63. The springs 93 can be coil springs in some embodiments of the detent mechanism such that the springs bias the body 92 and projection 95 in a linear vertical motion between the bottom 4b and top 4a of the housing.

First and second sides 96 and 97 of the body 92 can be on opposite sides of the projection 95, which may be in a central position of the body 92. The springs 93 can be positioned so that one spring engages the body adjacent the first side 96 and another spring 93 engages the body 92 adjacent the second side 97. In other alternative embodiments, there may be more than two springs, or there may only be one spring that engages the body 92 to bias motion of the projection 95. The springs can provide a pre-selected amount of force such that a user must provide a force that is greater than this pre-selected amount of force to release the elongated member 63 from its engagement with the projection 95 so that the elongated member is slideable out of the housing 4. In some embodiments, the pre-selected amount of force may be about 30 newtons. In other embodiments, the pre-selected amount of force may be greater than 30 newtons or less than 30 newtons.

The moveable body 92 can be positioned within a connector housing 99 that is positioned on the bottom 4b of the housing below the elongated member 63. The top of the connector housing 99 of the detent mechanism 91 can be configured to include a gap through which the projection 95 extends and can also have top wall portions 99a that extend from between this gap to other openings through which other portions of the body can extend to engage or otherwise contact the elongated member. For instance, a projection or protruding can extend from the body on the first and second sides 96, 97 of the body 92 to contact the elongated member as well to further supplement the releaseably anti-sliding force provided by the central projection 95.

Figure 20:
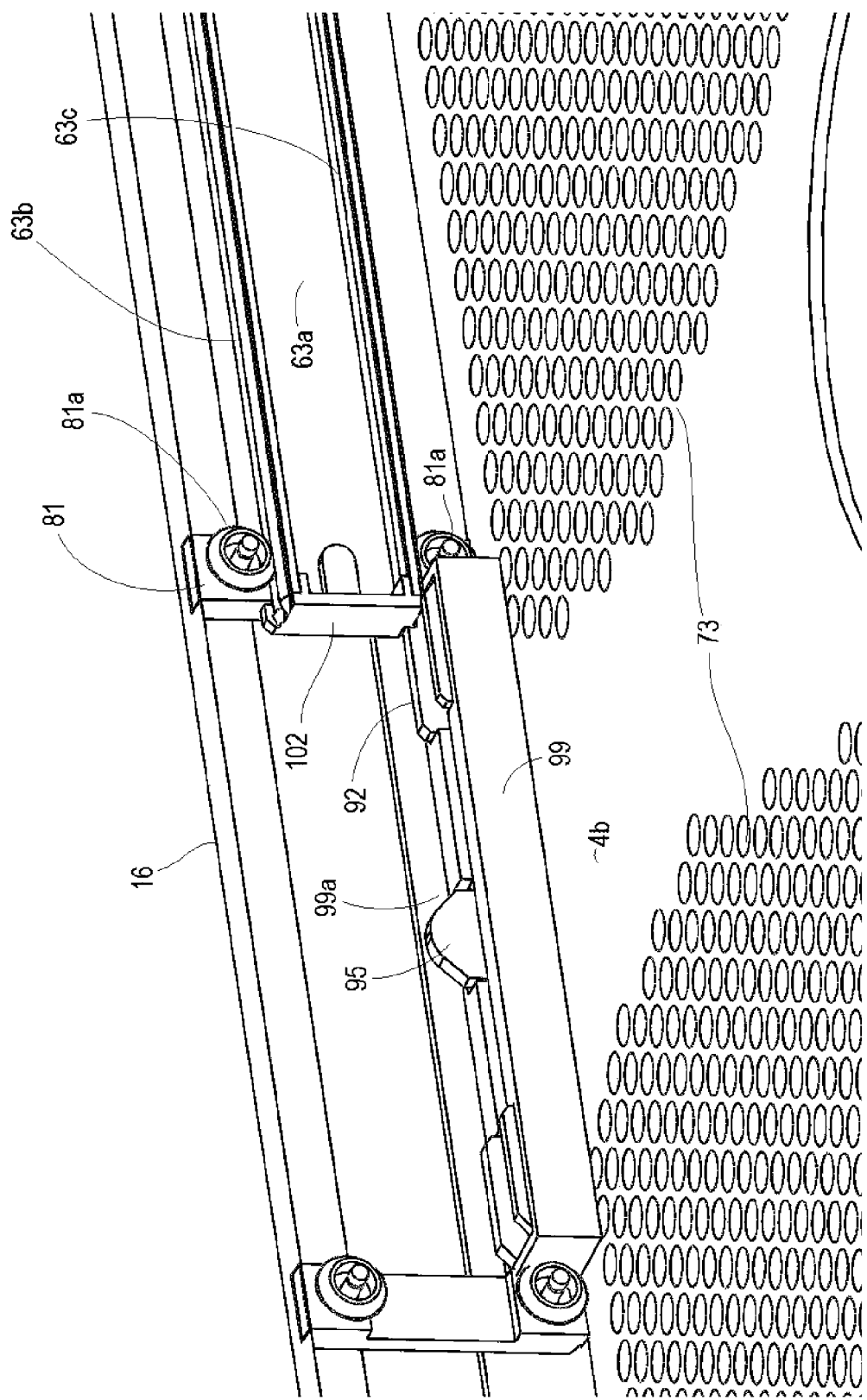
FIG. 20 is a fragmentary perspective view of the second exemplary embodiment of the display device apparatus with portions of the apparatus cut away to illustrate an end stop element attached to the bar element of the display device movement mechanism.

In some embodiments, end stops 102 can be connected to the ends of the elongated member to contact or otherwise engage wheels 81*a*, sidewall, protrusion or other guide member element of the carriage 81 to provide a hard stop to the sliding motion of the elongated member 63 to define outermost positions for each end of the elongated member 63 as may best be seen from FIG. 20. For instance, a first end of the elongated member may be attached to an end stop 102 and a second end of the elongated member opposite the first end of the elongated member can also be attached to an end stop 102. Each end stop can include structure such as a wall element or stop element that can close of an end of the central channel 63*a* and to define an end to that channel 63*a* and can also include one or more stop members adjacent the upper and lower 63*b*, 63*c* walls of the elongated member 63 to contact wheels 81*a* of one of the carriages 81 to prevent further sliding motion of the elongated member 63 out of the housing 4. Each end of the elongated member may have an end stop 102 that contacts or otherwise engages the wheels, sidewall, protrusion or other guide member feature of a respective one of the carriages 81 for defining the most extended position for the opposite end of the elongated member. For instance, a first inner carriage may engage the end stop 102 attached to the first end of the elongated member 63 when the second end of the elongated member is external to the housing in a maximum extended position and the second inner carriage 81 that is spaced apart from the first inner carriage 81 can engage the end stop 102 attached to the second end of the elongated member 63 when the first end is external to the housing 4 in a maximum extended position. In other embodiments, the carriages 81 having the wheels 81*a* can be arranged so that the same wheels 81*a* of the same carriage 81 are engaged by the end stops 102 attached to the opposite ends of the elongated member 63.

Figure 2:
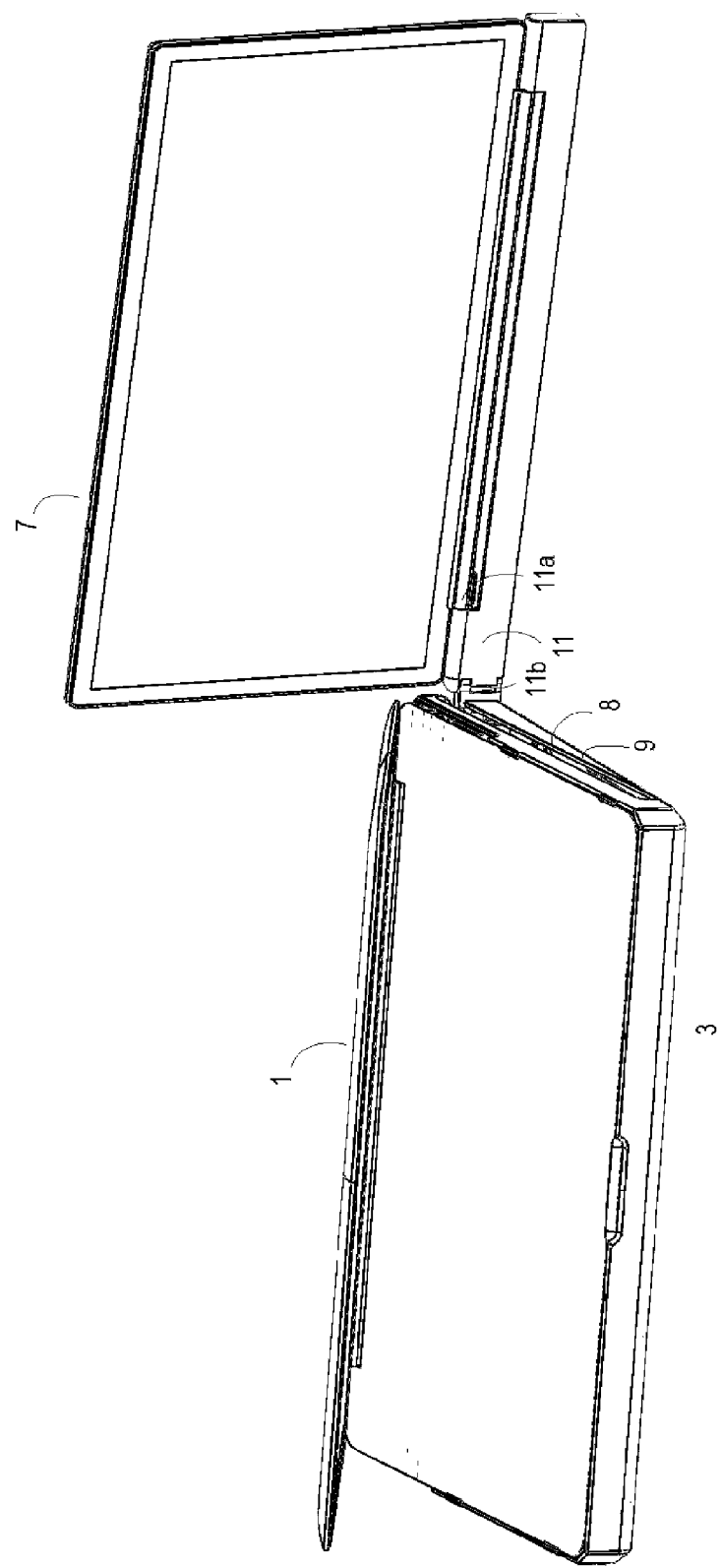
FIG. 2 illustrates a perspective view of a computer device attached to the first exemplary embodiment of the display device apparatus with the display device of the computer device in the first position and the display device of the display device apparatus in a second position.
Figure 3:
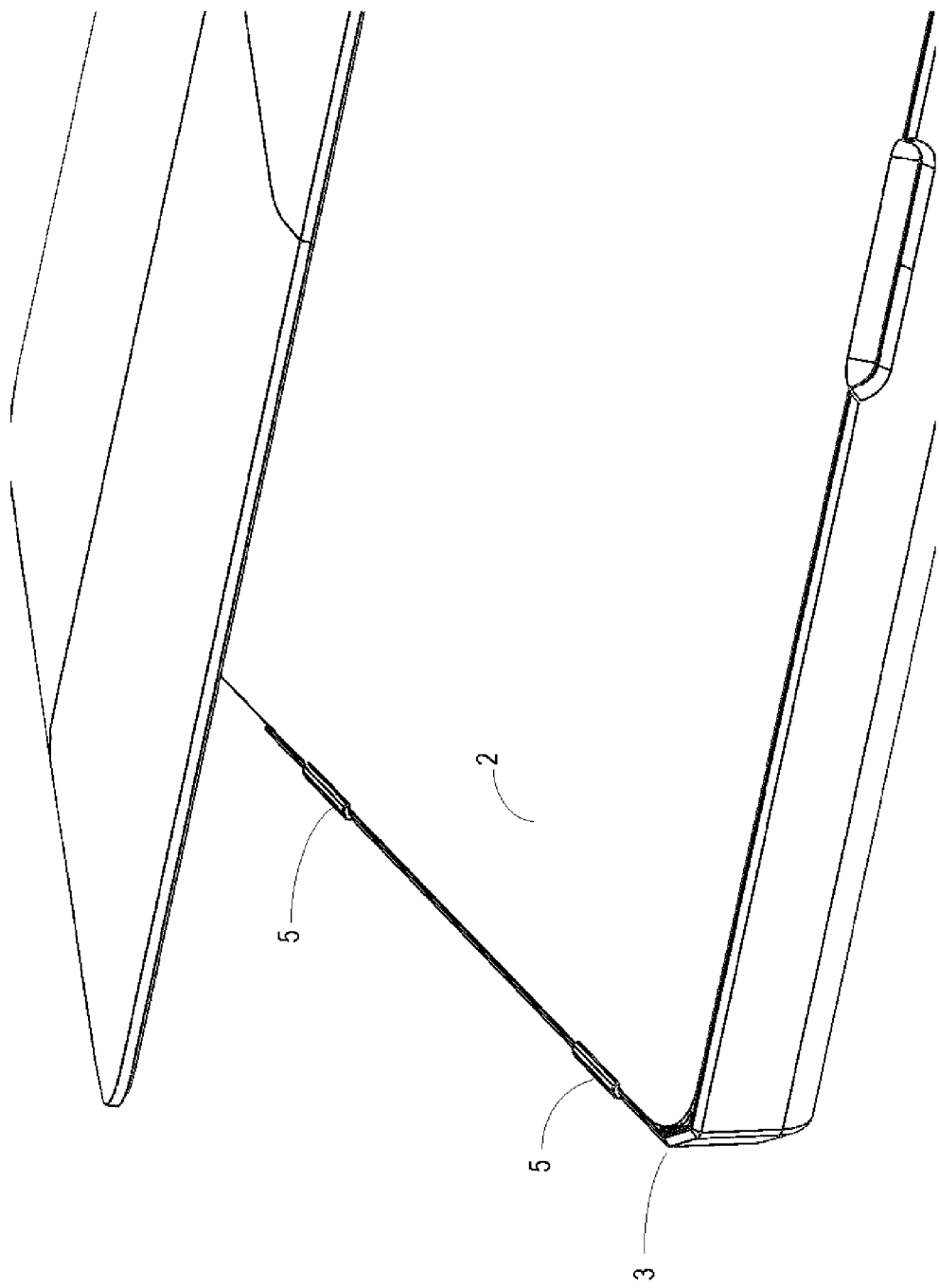
FIG. 3 illustrates an enlarged fragmentary view of the computer device attached to the first exemplary embodiment of the display device apparatus.
Figure 4:
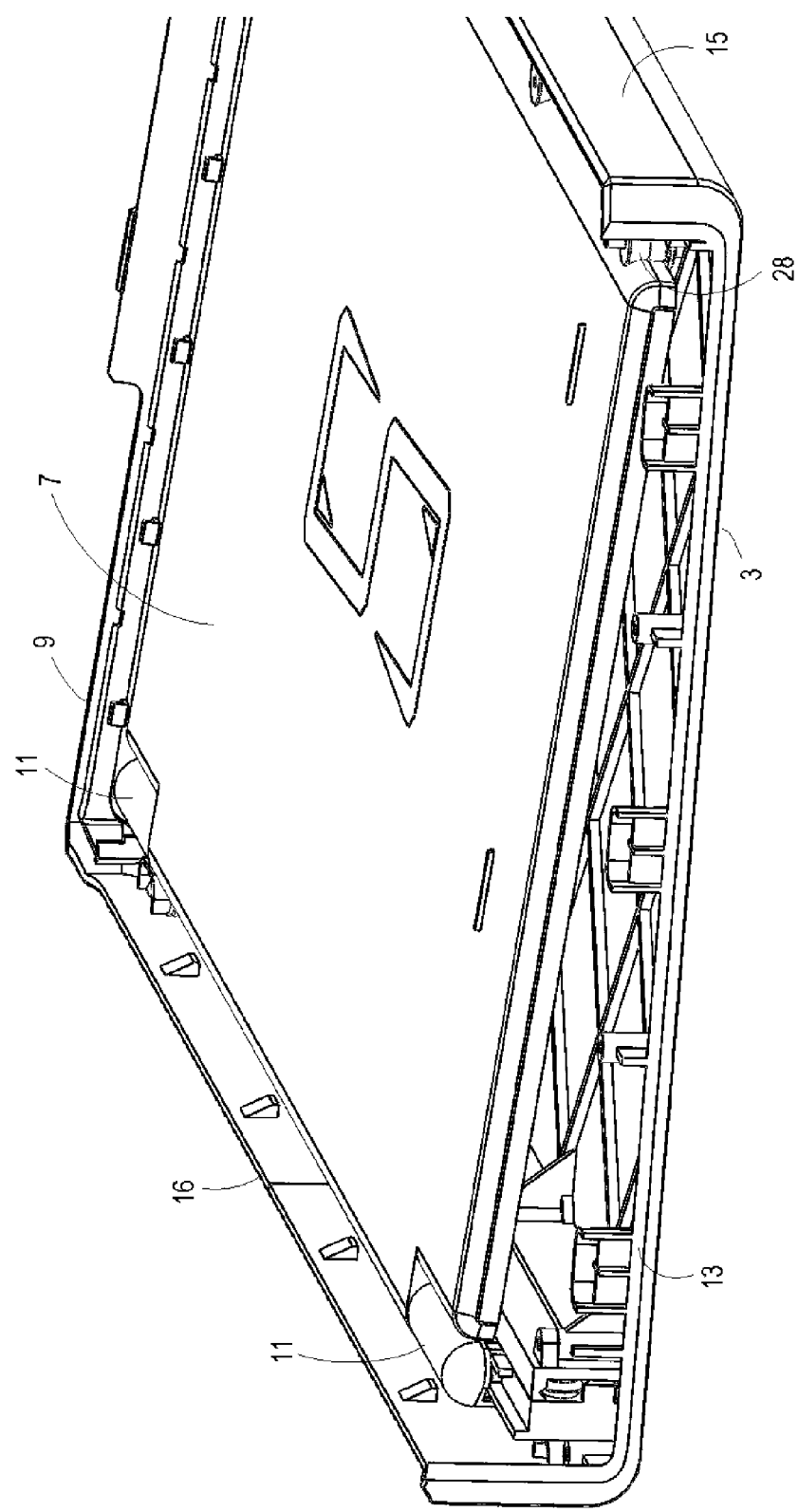
FIG. 4 illustrates a perspective view of the first exemplary embodiment of the display device apparatus.
Figure 5:
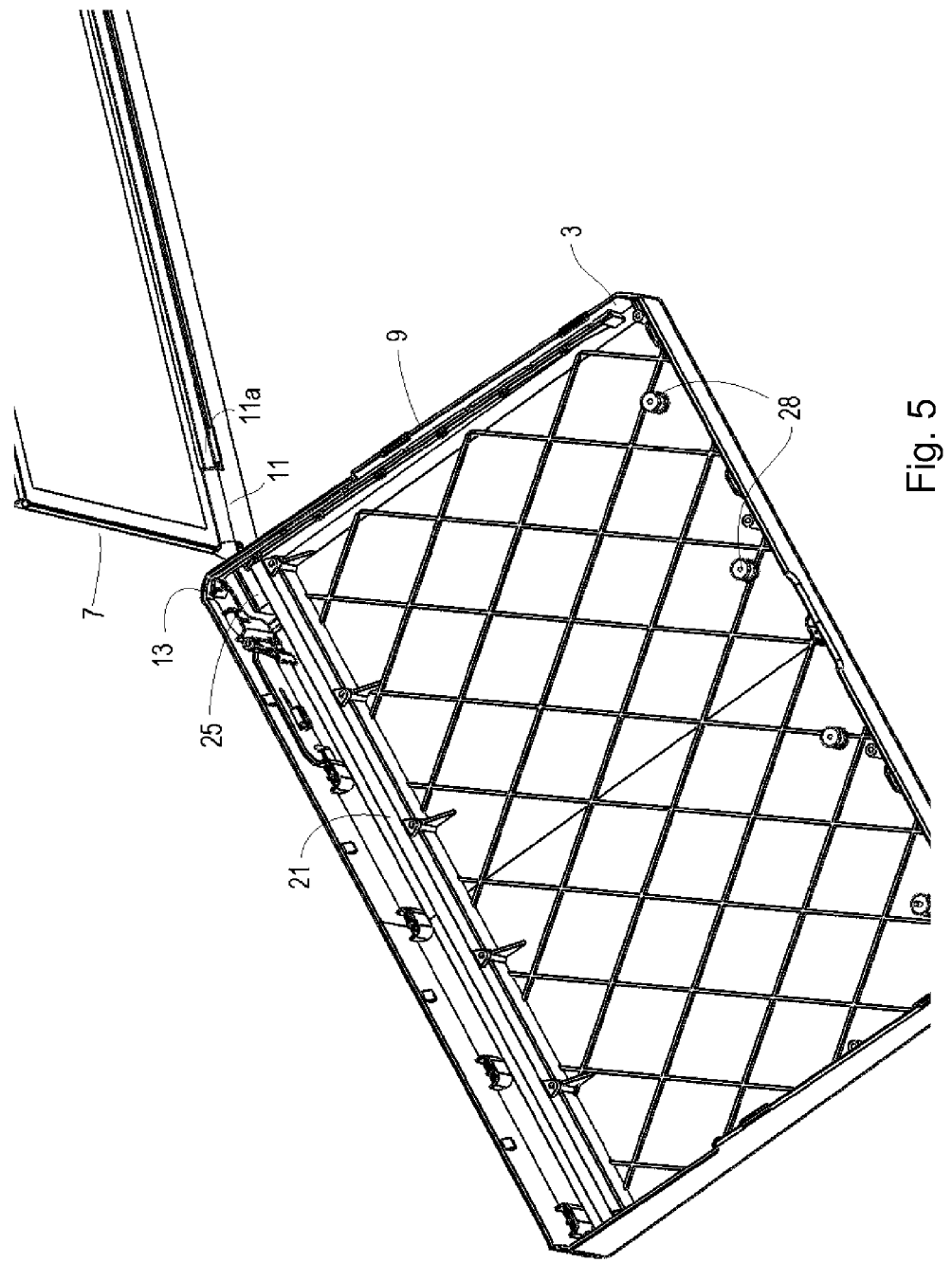
FIG. 5 is a fragmentary view of the first exemplary embodiment of the display device apparatus with the display device in the second position.
Figure 6:
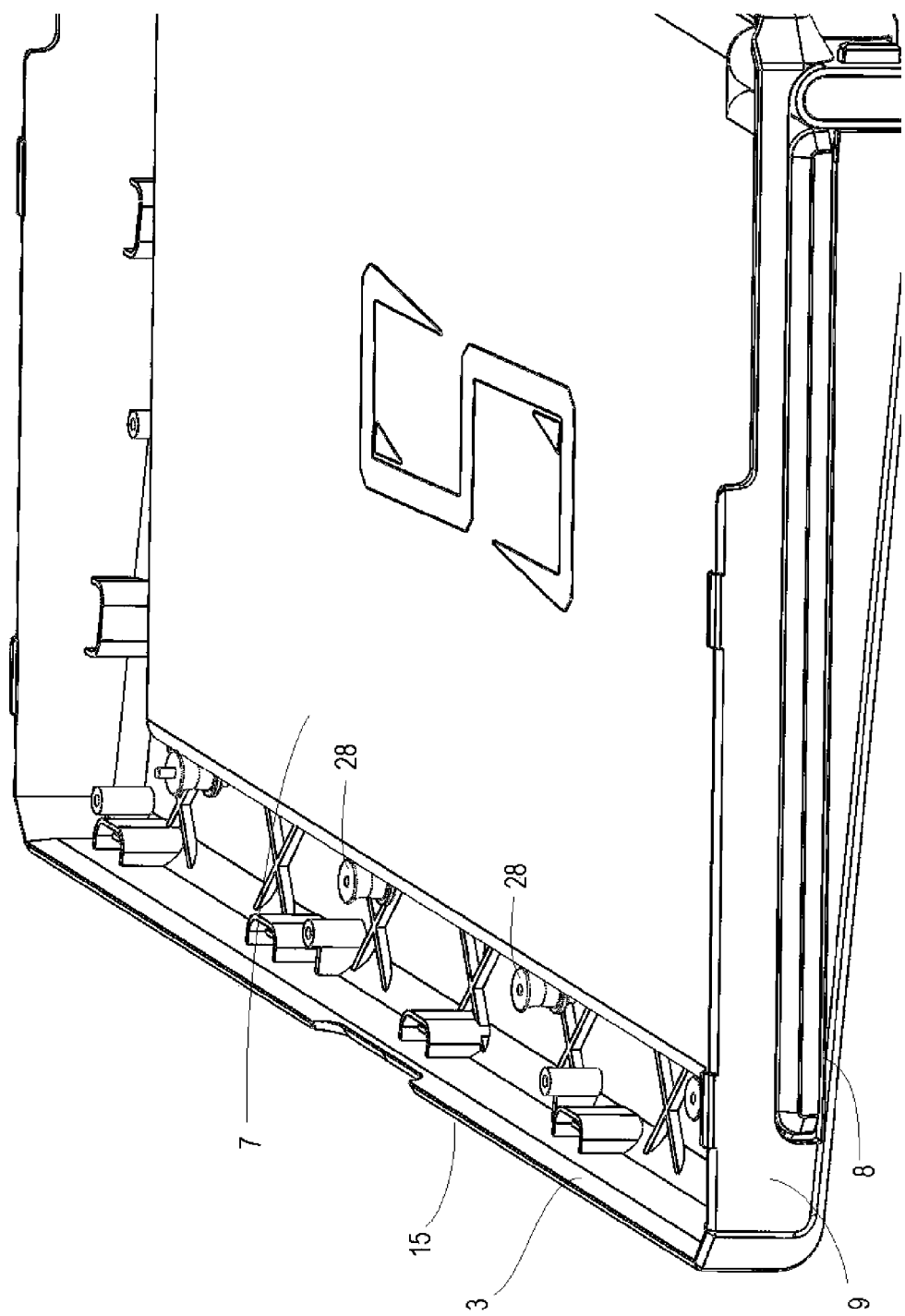
FIG. 6 is an enlarged fragmentary view of the front side of the first exemplary embodiment of the display device apparatus.
Figure 7:
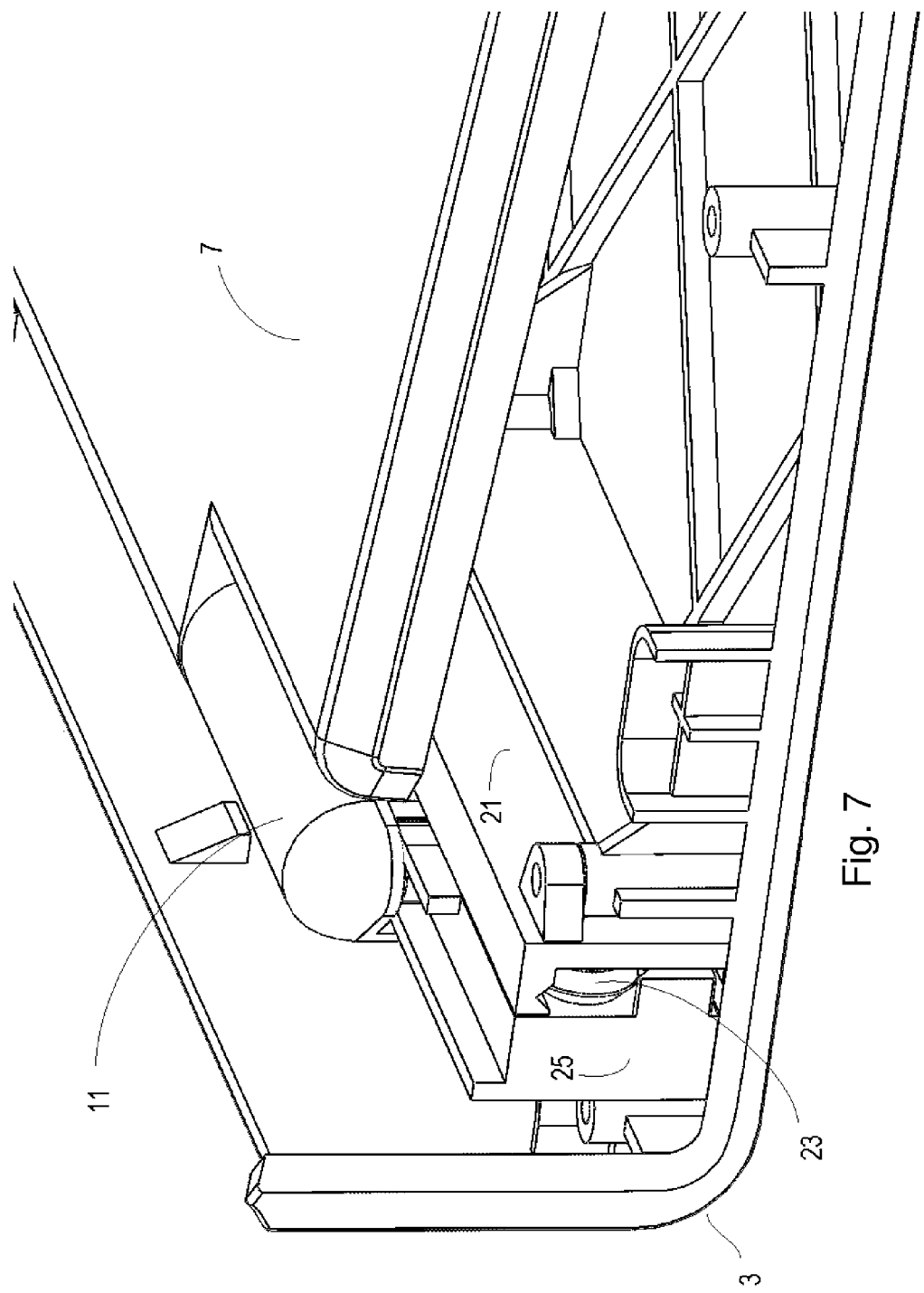
FIG. 7 is a fragmentary cross sectional view of the first exemplary embodiment of the display device apparatus with the display device of the display device apparatus in the first position.
Figure 8:
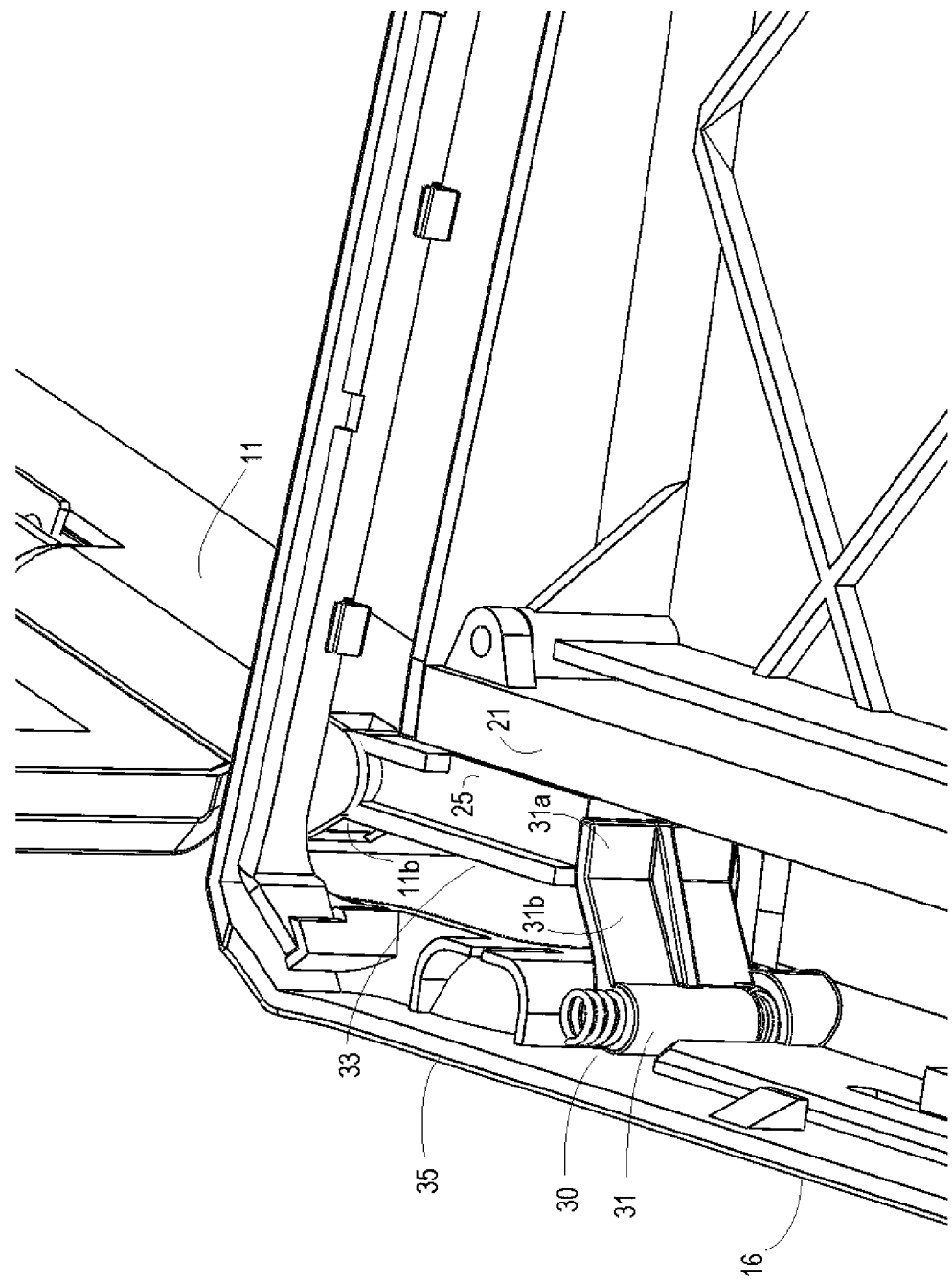
FIG. 8 is a fragmentary perspective view of the first exemplary embodiment of the display device apparatus with the display device of the display device apparatus in the second position.
Figure 9:
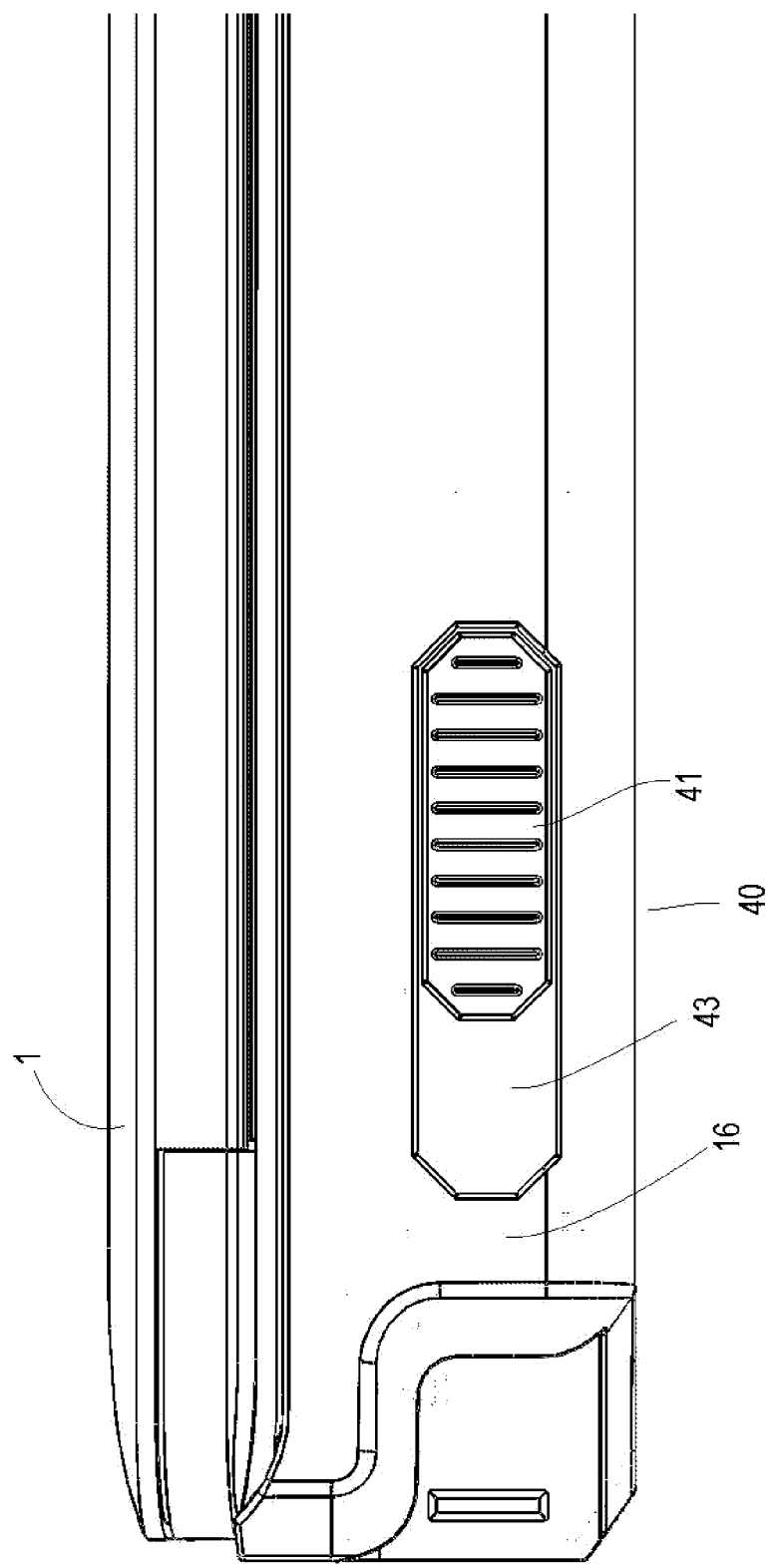
FIG. 9 is a rear perspective fragmentary view of the first exemplary embodiment of the display device apparatus.
Figure 10:
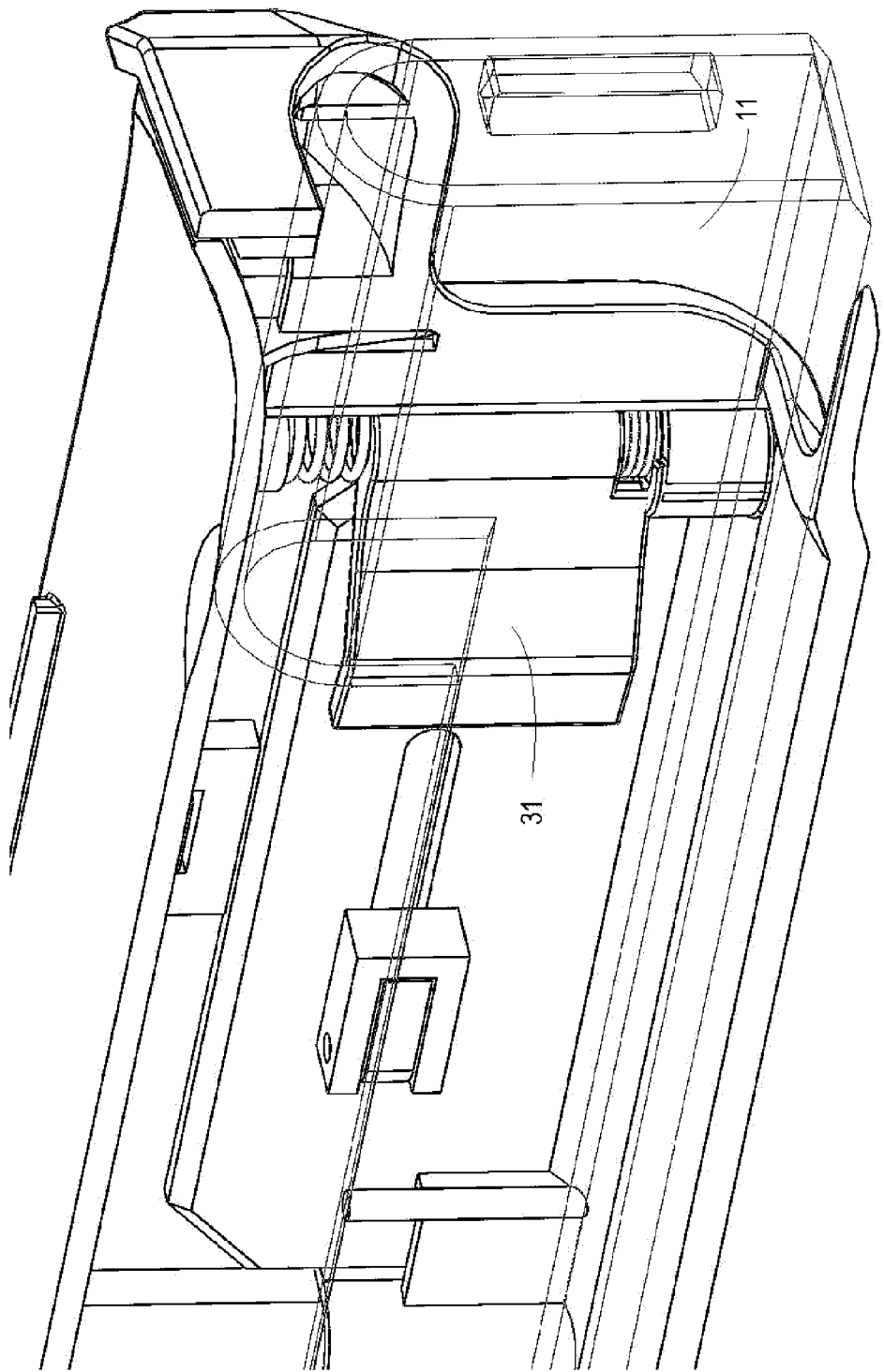
FIG. 10 is a fragmentary perspective view of the first exemplary embodiment of the display device apparatus with a portion of a hinge mechanism cut away to illustrate a detent mechanism in its first, retracted position, with the display device is in its first position.
Figure 11:
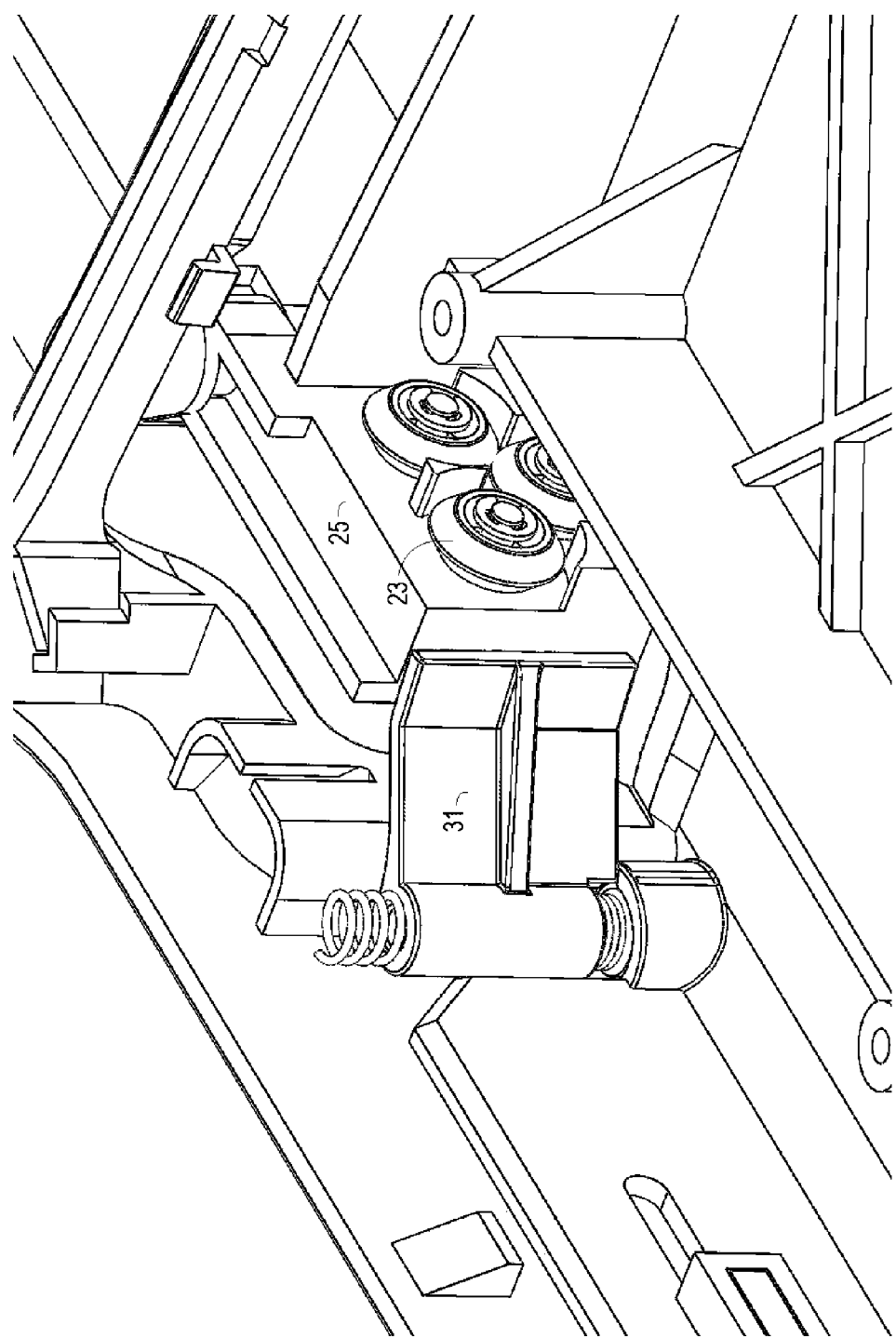
FIG. 11 is a fragmentary perspective view of the first exemplary embodiment of the display device apparatus with the display device of the display device apparatus in the second position.
Figure 12:
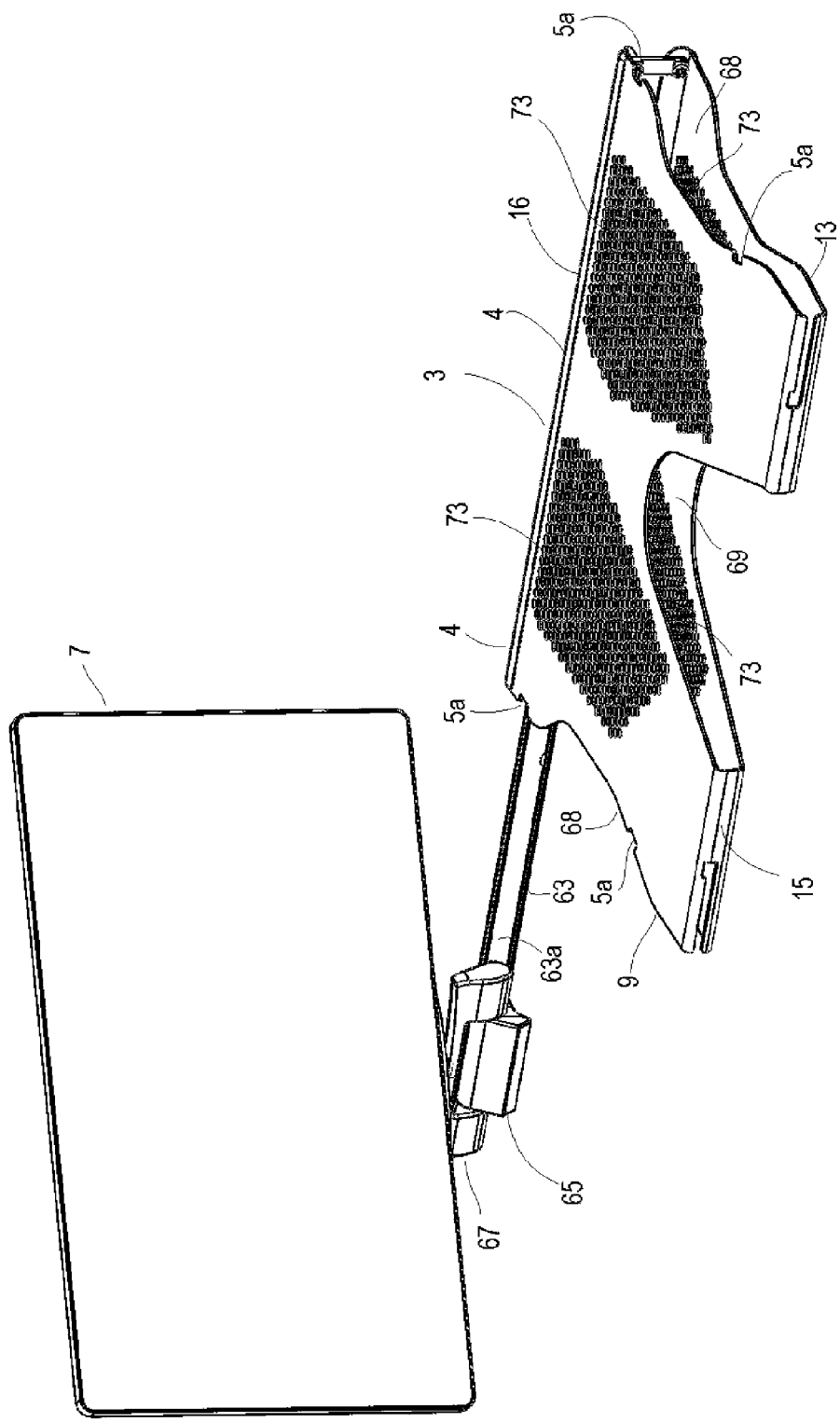
FIG. 12 is a perspective view of a second exemplary embodiment of the display device apparatus with the display device of the display device apparatus in a first position in which the display device is deployed by a first side of the housing of the apparatus.
Figure 13:
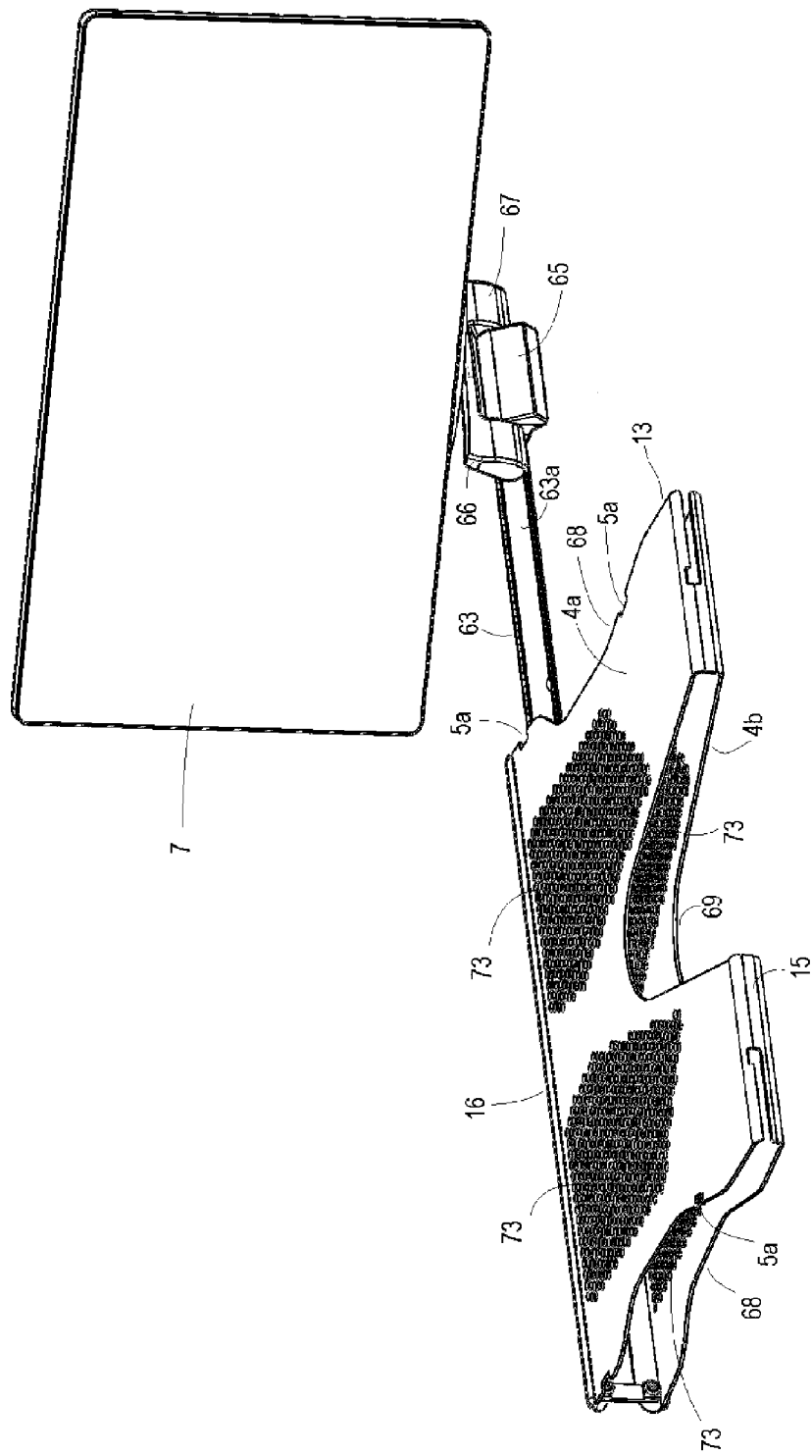
FIG. 13 is a perspective view of the second exemplary embodiment of the display device apparatus with the display device of the display device apparatus in a second position in which the display device is deployed by a second side of the housing of the apparatus.

The display device movement mechanism 65 may be configured so that the hinge assembly 66 is replaced with another type of moveable elongated member connector that permits adjustment of the second display device 7 that may be connected to the elongated member 63 via the elongated member connector to move from a flat, stowable horizontal orientation (e.g. position shown in FIGS. 1 and 4) in which the display device may be positioned inside the housing under a keyboard or primary screen of a computer device to a more vertical orientation in which the screen is oriented vertically for use by a user outside of the housing (e.g. position shown in FIG. 2). For instance, the elongated member 63 can be configured to have a profile and the elongated member connector may have a first end having a profile that is configured to be mateably and releaseably attached to the profile of the elongated member 63 in at least two different orientations—a first orientation in which the elongated member connector may extend along its length horizontally from its first end attachable to the elongated member 63 to its distal second end for being stowable within the housing and a second orientation in which the elongated member may extend vertically from its first end to its distal second end along the length of the elongated member connector. The first end of the elongated member connector may be configured so that it is decoupled from the elongated member to change the orientation of the elongated member connector from its first orientation to its second orientation and vice versa. The second distal end of the elongated member connector and/or at least a portion of its body between its first and second ends may be configured to hold and retain the second display device as it is moved between its first and second orientations. In other embodiments, the second distal end of the elongated member connector and/or at least a portion of its body between its first and second ends can be configured to be releaseably attached to the second display device 7 which may releaseably matingly retain a portion of the second display device 7 for holding the display device 7 after the elongated member connector is moved to its first orientation or second orientation. Such a configuration can result in the second display device having to be decoupled from the elongated member connector before the elongated member connector and the second display device are changed in orientation between stowable and use positions. The second display device 7 can be configured to be reconnected to the elongated member connector after each element is moved to its desired orientation and/or the elongated member connector is reconnected to the elongated member 63 after being adjusted to a new orientation via its first end.

The second display device 7 can be connectable to the computer device 1 such that the computer device 1 can send data to the second display device 7 that the second display device can subsequently utilize to generate one or more displays for proving output to a user. For instance, a second display device 7 can be connectable to the computer device via a universal serial bus connection or via a wireless connection to an interface of the computer device 1. The universal serial bus connection or wireless connection can be provided by a circuit board that is connected to the hinge assembly. The circuit board may be a component of the second display device attached to the hinge assembly, for example. In some embodiments, the connection to the second display device 7 can include a high definition multimedia interface (HDMI) or video graphic array (VGA), Thunderbolt connector provided by Apple, Inc., or other type of display device connector.

While certain exemplary embodiments of the display device apparatus 3, and methods of making and using the same have been shown and described above, it is to be distinctly understood that the invention is not limited thereto but may be otherwise variously embodied and practiced within the scope of the following claims.

What is claimed is:

1. A display device apparatus that is attachable to a computer device, the computer device having a first display device, the display device apparatus comprising: a housing, the housing having a cavity defined therein and a slot defined therein that is in communication with the cavity, the housing being attachable to a first side of the computer device, the cavity being sized and configured to releaseably retain a second display device that is connectable to the computer device, the slot being sized and configured such that the second display device that is positionable into the cavity is moveable out of the cavity such that the second display device is moveable out of the housing and is positionable external to the housing; the second display device being communicatively connectable to the computer device to provide output of data that the second display device receives from the computer device; a hinge assembly, the hinge assembly moveably connected between the second display device and the housing such that the second display device is moveable from a first position in which the second display device is positioned within the cavity to at least one second position in which the second display device is positioned external to the cavity; wherein the hinge assembly is configured such that the second display device passes through the slot when the second display device is moved from the first position to the second position; the hinge assembly being comprised of a first hinge and a second hinge, the first hinge being configured to define a first substantially horizontal axle about which the second display device is rotatable and the second hinge being configured to define a first substantially vertical axle about which the second display device is rotatable; wherein the at least one second position is comprised of a first external position and a second external position, and an elongated member that is slideable relative to the housing to the first external position adjacent a first side of the housing and the second external position adjacent a second side of the housing, a first end of the elongated member being external to the housing adjacent the first side of the housing when the elongated member is in the first external position and a second end of the elongated member being external to the housing adjacent to the second side of the housing when the elongated member is in the second external position.

2. The display device apparatus of claim 1, wherein the hinge assembly is further comprised of a moveable body that is moveable along the elongated member, the moveable body being moveable along a linear path or a curved path defined by the elongated member.

3. The display device apparatus of claim 2, wherein the hinge assembly is further comprised of a carriage having at least one wheel that engages the elongated member.

4. The display device apparatus of claim 1, further comprising a detent mechanism, the detent mechanism being configured to engage the elongated member to bias the elongated member in a position in which the second display device is within the housing.

5. The display device apparatus of claim 4, wherein the detent mechanism is comprised of a projection that is biased within an aperture formed in the elongated member to retain the second display device within the position in which the second display device is within the housing.

6. The display device apparatus of claim 1, wherein the first end is connected to an end stop and the second end is connected to an end stop, the first and second end stops each being configured to engage at least one wheel of a carriage attached to the housing.

7. The display device apparatus of claim 6 wherein elongated member has a channel and wherein the hinge assembly is moveably connected to the elongated member within the channel such that the hinge assembly is moveable relative to the elongated member by motion along the channel.

8. The display device apparatus of claim 1, wherein the second display device being communicatively connectable to the computer device via a display device connector, a universal serial bus connection, a video graphics array connector, a high definition multimedia interface connection, or a wireless communication connection.

9. The display device apparatus of claim 1, comprising: a plurality of fingers projecting from an upper side of the housing, the fingers being sized and configured to releaseably attach to the first side of the computer device.

10. A display device apparatus that is attachable to a computer device, the computer device having a first display device, the display device apparatus comprising: a housing, the housing having a cavity defined therein and a slot defined therein that is in communication with the cavity, the housing being attachable to a first side of the computer device, the cavity being sized and configured to releaseably retain a second display device that is connectable to the computer device, the slot being sized and configured such that the second display device that is positionable into the cavity is moveable out of the cavity such that the second display device is moveable out of the housing and is positionable external to the housing; the second display device being communicatively connectable to the computer device to provide output of data that the second display device receives from the computer device; a moveable connection assembly moveably connecting the second display device to the housing such that the second display device is moveable from a first position in which the second display device is positioned within the cavity to a second position in which the second display device is positioned external to the cavity; wherein the moveable connection assembly is comprised of: a hinge assembly comprised of a first hinge and a second hinge, the first hinge being configured to define a first substantially horizontal axle about which the second display device is rotatable and the second hinge being configured to define a first substantially vertical axle about which the second display device is rotatable, the hinge assembly moveably connected between the second display device and the housing such that the second display device is moveable from the first position in which the second display device is positioned within the cavity to at least one second position in which the second display device is positioned external to the cavity; wherein the hinge assembly is configured such that the second display device passes through the slot when the second display device is moved from the first position to the second position; an elongated member that is moveable out of the housing as the second display device is moved from the first position to the second position and is moveable into the housing as the second display device is moved from the second position to the first position, and an elongated member connector that has a first end that is configured to be releaseably connected to the elongated member such that the elongated member connector is extendable from the elongated member such that a length of the elongated member connector extends horizontally when the display device is positioned in the first position via the moveable connection assembly and the length of the elongated member connector extends vertically when the display device is positioned in the second position via the moveable connection assembly moveably.

11. The display device apparatus of claim 10, wherein the hinge assembly is further comprised of a moveable body that is moveable along an elongated member that is moveably connected to the housing, the moveable body being moveable along a linear path defined by a channel of the elongated member.

12. The display device apparatus of claim 10, further comprising a detent mechanism, the detent mechanism being configured to engage the elongated member when the second display device is in the first position.

13. The display device apparatus of claim 12, wherein the detent mechanism is comprised of a projection that is biased into an aperture of the elongated member when the second display device is in the first position and the elongated member is in a position in which an entirety of the elongated member is within the housing.

* * * * *